(12) United States Patent
Song et al.

(10) Patent No.: US 11,592,615 B2
(45) Date of Patent: Feb. 28, 2023

(54) POLYMER WAVEGUIDE ACCOMMODATING DISPERSED GRAPHENE AND METHOD FOR MANUFACTURING THE SAME, AND LASER BASED ON THE POLYMER WAVEGUIDE

(71) Applicant: KOREA INSTITUTE OF SCIENCE AND TECHNOLOGY, Seoul (KR)

(72) Inventors: Yong-Won Song, Seoul (KR); Bowon Ryu, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 411 days.

(21) Appl. No.: 17/019,354

(22) Filed: Sep. 14, 2020

(65) Prior Publication Data

US 2021/0247565 A1 Aug. 12, 2021

(30) Foreign Application Priority Data

Feb. 11, 2020 (KR) .................. 10-2020-0016361

(51) Int. Cl.
*G02B 6/02* (2006.01)
*H01S 3/067* (2006.01)

(52) U.S. Cl.
CPC ..... *G02B 6/02123* (2013.01); *G02B 6/02033* (2013.01); *H01S 3/06716* (2013.01)

(58) Field of Classification Search
CPC ................... G02B 6/02123; G02B 6/02033
See application file for complete search history.

(56) References Cited

U.S. PATENT DOCUMENTS

| 2011/0158268 | A1 | 6/2011 | Song |
| 2013/0071083 | A1 | 3/2013 | Kim |
| 2015/0214305 | A1 | 7/2015 | Jeon et al. |
| 2017/0242189 | A1 | 8/2017 | Yokoyama et al. |
| 2019/0027889 | A1 | 1/2019 | Song et al. |
| 2019/0330482 | A1 | 10/2019 | Williams |

FOREIGN PATENT DOCUMENTS

| CN | 107037509 A | * | 8/2017 | ............ G02B 1/048 |
| CN | 110147000 A | | 8/2019 | |
| CN | 110441861 A | | 11/2019 | |
| JP | 2004-279678 A | | 10/2004 | |
| KR | 101028803 B1 | | 4/2011 | |
| KR | 10-2013-0031598 A | | 3/2013 | |

(Continued)

OTHER PUBLICATIONS

Korean Notice of Allowance for KR Application No. 10-2020-0016361 dated Mar. 17, 2022.

(Continued)

*Primary Examiner* — Joseph L Williams
(74) *Attorney, Agent, or Firm* — Cantor Colburn LLP

(57) ABSTRACT

Embodiments relate to a polymer waveguide including a substrate, a cladding layer made of a first polymer, formed on the substrate, wherein a first monomer is polymerized into the first polymer, and the cladding layer has a groove for the waveguide by removing part of the cladding layer, and a core accommodating graphene therein, formed on the groove, a method for manufacturing the same, and a passively mode-locked laser based on the polymer waveguide.

12 Claims, 25 Drawing Sheets

(56) References Cited

FOREIGN PATENT DOCUMENTS

| KR | 10-2015-0089512 A | 8/2015 |
|----|-------------------|--------|
| KR | 10-2019-0009962 A | 1/2019 |
| KR | 102132809 B1      | 7/2020 |

OTHER PUBLICATIONS

Lan Li et al., "A Fully-Integrated Flexible Photonic Platform for Chip-to-Chip Optical Interconnects," Journal of Lightwave Technology, Dec. 2013, pp. 4080-4086, vol. 31, No. 24.

Pieter Dumon et al., "Low-Loss SOI Photonic Wires and Ring Resonators Fabricated With Deep UV Lithography," IEEE Photonics Technology Letters, May 2004, pp. 1328-1330, vol. 16, No. 5.

* cited by examiner

Dispersed graphene distributed in waveguide

O : rGO Flakes

Direct interaction

POLYMER WAVEGUIDE ACCOMMODATING DISPERSED GRAPHENE AND METHOD FOR MANUFACTURING THE SAME, AND LASER BASED ON THE POLYMER WAVEGUIDE

CROSS-REFERENCE TO RELATED APPLICATION

This application claims priority to Korean Patent Application No. 10-2020-0016361, filed on Feb. 11, 2020, and all the benefits accruing therefrom under 35 U.S.C. § 119, the contents of which in its entirety are herein incorporated by reference.

BACKGROUND

1. Field

The present disclosure relates to technology that manufactures a polymer waveguide accommodating dispersed graphene, and more particularly, to a method for manufacturing a polymer waveguide configured such that graphene directly faces a peak of a light field propagating in the waveguide and its surrounding region, a polymer waveguide manufactured by the method, and a passively mode-locked laser based on the polymer waveguide.

DESCRIPTION ABOUT NATIONAL RESEARCH AND DEVELOPMENT SUPPORT

This study was supported by the National Research Foundation of Korea (First Project Name. Application of nonlinear light information of graphene that is directly synthesized in 3D structure by Atomic Carbon Spray process, First Project No. 1711099432; Second Project Name. Development of eyepiece type diabetes diagnosis device, Second Project No. 2015M3A9E2030105) under the superintendence of Ministry of Science, ICT and Future Planning, Republic of Korea.

2. Description of the Related Art

Recently, optical waveguide-based systems receive much attention as useful applications for low cost and high efficiency data communication. Particularly, optical waveguide-based systems such as board-to-board or chip-to-chip applications receive much attention in the field of near-field communication.

In data communication, it is very important to control data at a high rate. Graphene achieves fast control of propagating light due to the properties of linear dispersion of diracfermion, ultrafast recovery time, wavelength-independent saturable absorption and very high optical nonlinearity, and thus is gaining attention in the electronic and optical field, especially in the field of optical communication.

Patent No. 10-1028803 (Patent Literature 1, titled: Modelocker comprising graphene and pulse laser device comprising the same) discloses an optical waveguide-based system combined with graphene.

In general, graphene is produced on a wafer with high quality, transferred to a different substrate and patterned on a device. As disclosed by Patent Literature 1, when combined with the optical waveguide-based system, graphene is transferred and installed on the side of a waveguide for optical operation based on the nonlinear property.

FIG. 1 is a conceptual diagram of interaction between a laser and transferred graphene according to an embodiment of the related art.

Referring to FIG. 1, a side transfer structure guarantees interaction between a propagating laser and graphene on a long range over the length of the transferred graphene.

However, this interaction is in between the evanescent field of the optical signal and the graphene. The laser intensity of the evanescent field corresponds to a low part of the overall intensity of the propagating laser as shown in FIG. 1, and in optical waveguide-based system having the side transfer structure, the interaction result is presented as a low value. As a consequence, high efficiency of optical operation cannot be expected.

SUMMARY

According to an aspect of the present disclosure, the present disclosure is directed to providing a method for manufacturing an optical waveguide containing dispersed graphene therein.

The present disclosure is further directed to providing an optical waveguide including dispersed graphene, formed using the method, and a passively mode-locked laser system based on the optical waveguide.

A method for manufacturing a polymer waveguide accommodating dispersed graphene according to an aspect of the present disclosure may include forming a cladding layer made of a first polymer on a substrate, removing part of the cladding layer to form a groove for the waveguide, and forming a core accommodating dispersed graphene therein on the groove.

In an embodiment, forming the core may include coating a graphene dispersed solution on the groove, and curing the graphene dispersed solution to form the core. Here, the graphene dispersed solution is a mixed solution in which a suspension containing graphene dissolved in an organic solvent that dissolves a polar molecule is mixed with a second monomer solution that will be polymerized into a polymer.

In an embodiment, the mixed solution may have a graphene concentration lower than a threshold concentration at which the graphene is kept in a dispersed state.

In an embodiment, the core accommodating the dispersed graphene may be configured to have a higher effective refractive index than the cladding layer.

In an embodiment, the threshold concentration may be $0.95 \times 10^{-3}$ wt % to $1.05 \times 10^{-3}$ wt %.

In an embodiment, a concentration of the graphene dissolved in the suspension may be $7 \times 10^{-4}$ wt % or above and $9 \times 10^{-4}$ wt % or less.

In an embodiment, the graphene dispersed in the core may be in the form of flakes.

In an embodiment, the core and the cladding layer may be cured at a temperature of 100 to 200° C. to prevent crystals of the graphene from being damaged.

In an embodiment, the graphene may be at least one material selected from the group consisting of pure graphene, oxidized graphene by oxidation of the pure graphene, reduced graphene by reduction of the pure graphene and a combination thereof.

In an embodiment, curing the graphene dispersed solution may include, when reduced graphene is dissolved in the mixed solution, polymerizing the second monomer of the mixed solution into a second polymer and photopolymerizing the mixed solution to restore disrupted $sp^2$ bonds in the dissolved reduced graphene oxides (rGO).

A polymer waveguide according to another aspect of the present disclosure may include: a substrate; a cladding layer made of a first polymer, formed on the substrate, wherein a first monomer is polymerized into the first polymer, and the cladding layer has a groove for the waveguide by removing part of the cladding layer; and a core accommodating graphene therein, formed on the groove.

A passively mode-locked laser includes the polymer waveguide of the above embodiment, a laser cavity to generate a continuous wave laser. Further, the passively mode-locked laser further include at least one of a wavelength division multiplexer to be connected to an amplifier that provide a gain into the laser cavity, an isolator, a polarization controller (PC), and a coupler. Here, the polymer waveguide may be configured to generate a pulsed laser by interaction of graphene with a propagating laser.

The method for manufacturing a graphene-dispersed polymer waveguide according to an aspect of the present disclosure may produce a waveguide through a relatively simple polymerization process. Additionally, the method does not include a deposition process through the chemical vapor deposition (CVD) technique and a transfer process to install graphene, and uses graphene in smaller quantities.

As a result, the method has simple manufacturing process and low cost advantages.

Additionally, the method may obtain an optical waveguide containing graphene at the concentration to induce interaction for a desire level of nonlinear property, while the graphene is so dispersed not to obstruct the propagation of an optical signal.

Accordingly, as graphene faces a propagating laser having the peak power. Hence, it is possible to obtain a polymer waveguide having outstanding nonlinearity, the said polymer waveguide has stronger interaction of the laser with graphene than a polymer waveguide structure using an evanescent field.

As graphene is not attached to the surface, the waveguide manufactured as above has higher spatial adaptation and utilization than when graphene is transferred onto the surface. Further, graphene is not damaged by the external environment, and nonlinearity is maintained for a long term.

The effects of the present disclosure are not limited to the above-mentioned effects, and other effects not mentioned herein will be clearly understood by those skilled in the art from the appended claims.

BRIEF DESCRIPTION OF THE DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some modified elements such as exaggerated and omitted elements.

DETAILED DESCRIPTION

The terminology used herein is for the purpose of describing particular embodiments only and is not intended to be limiting of the present disclosure. The singular forms as used in the present disclosure and the appended claims are intended to include the plural forms as well, unless the context clearly indicates otherwise. Additionally, it should be understood that "and/or" as used herein includes any or all possible combination of one or more relevant items. Additionally, the term "comprises" or "includes" when used in this specification, specifies the presence of stated features, regions, integers, steps, operations, elements, and/or components, but does not preclude the presence or addition of one or more other features, regions, integers, steps, operations, elements and/or components.

The terms "on" and "below" as used herein indicate a relative positional relationship, and does not indicate an absolute positional relationship according to an observer's view (for example, based on the gravity or coordinates). Additionally, it will be further understood that when an element is referred to as being "on" another element, it can be immediately on the other element or intervening elements may be present. In contrast, when an element is referred to as being "immediately on" another element, there is no intervening element.

The terms "first", "second", "third", and the like are used to describe various parts, components, regions, layers and/or sections, but not limited thereto. These terms are used to distinguish one part, component, region, layer or section from another. Accordingly, a first part, component, region, layer or section as used herein may be referred to as a second part, component, region, layer or section without departing from the scope of the present disclosure.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

Figure 2:
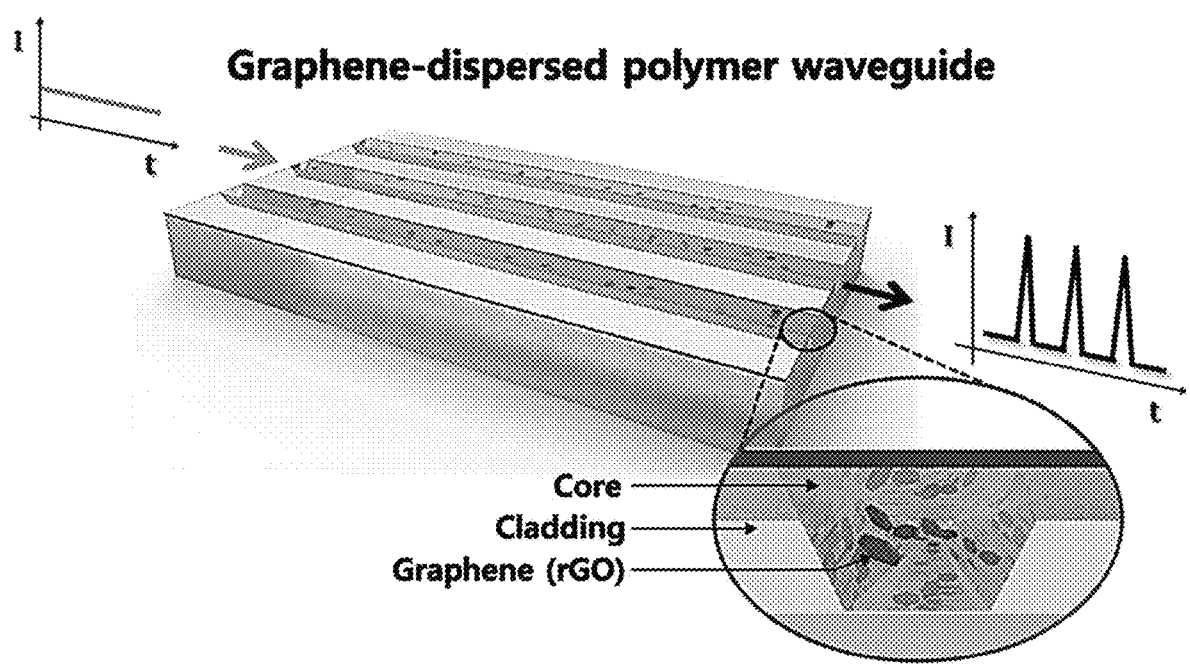
FIG. 2 is a conceptual diagram of a graphene-dispersed optical waveguide according to an embodiment of the present disclosure.

FIG. 2 is a conceptual diagram of a graphene-dispersed polymer waveguide according to an embodiment of the present disclosure.

The graphene-dispersed polymer waveguide 10 according to an aspect of the present disclosure is an optical waveguide made of a polymer in which graphene is dispersed in the waveguide. Referring to FIG. 2, the polymer waveguide 10 includes a substrate 100; a cladding layer 110; and a core layer 300 including a core 310.

The substrate 100 is a component that supports the optical waveguide, and the substrate 100 may be made of a material including silicon (Si), but is not limited thereto.

The cladding layer 110 and the core layer 300 are formed on the substrate 100, and are made of a material including a polymer. The cladding layer 110 and the core layer 300 are made of a low temperature processable polymer.

The cladding layer 110 is formed with a structure (for example, a groove structure) in which an laser propagates in a direction in which the core 310 extends due to a refractive index difference between the core 310 and the cladding layer 110. To this end, the cladding layer 110 has at least lower effective refractive index than the core 310.

The polymer material includes an organic polymer and/or an inorganic polymer. In an embodiment, for the refractive index difference, the polymer (or monomer) that forms the cladding layer 110 may be different from the polymer (or monomer) that form the core layer 300. Hereinafter, for clarity of description, the present disclosure will be described in more detail by referring to the monomer or polymer related to the cladding layer 110 as a first monomer and a first polymer, and the monomer or polymer related to the core layer 300 as a second monomer and a second polymer.

In an embodiment, in the core layer 300, the core 310 is made of a material including a polymer and graphene, and at least part of a region that is different from the core 310 is made of a material including a polymer. The graphene in the core 310 is in a dispersed state. Here, the dispersed state represents that there is no agglomeration and/or precipitation.

In an embodiment, the graphene in the core 310 may be in the form of flakes, but is not limited thereto.

In an embodiment, the graphene that makes the polymer waveguide 10 nonlinear may be at least one material selected from the group consisting of non-oxidized or non-reduced graphene (i.e., pure graphene), graphene oxide (for example, by oxidation of pure graphene), reduced graphene oxide (for example, by reduction of graphene oxide) and a combination thereof. By virtue of the graphene, the polymer waveguide 10 may function as an optical waveguide as well as an optically nonlinear device, for example, to convert a continuous wave (CW) signal to a pulsed signal as shown in FIG. 2.

Figure 3A:
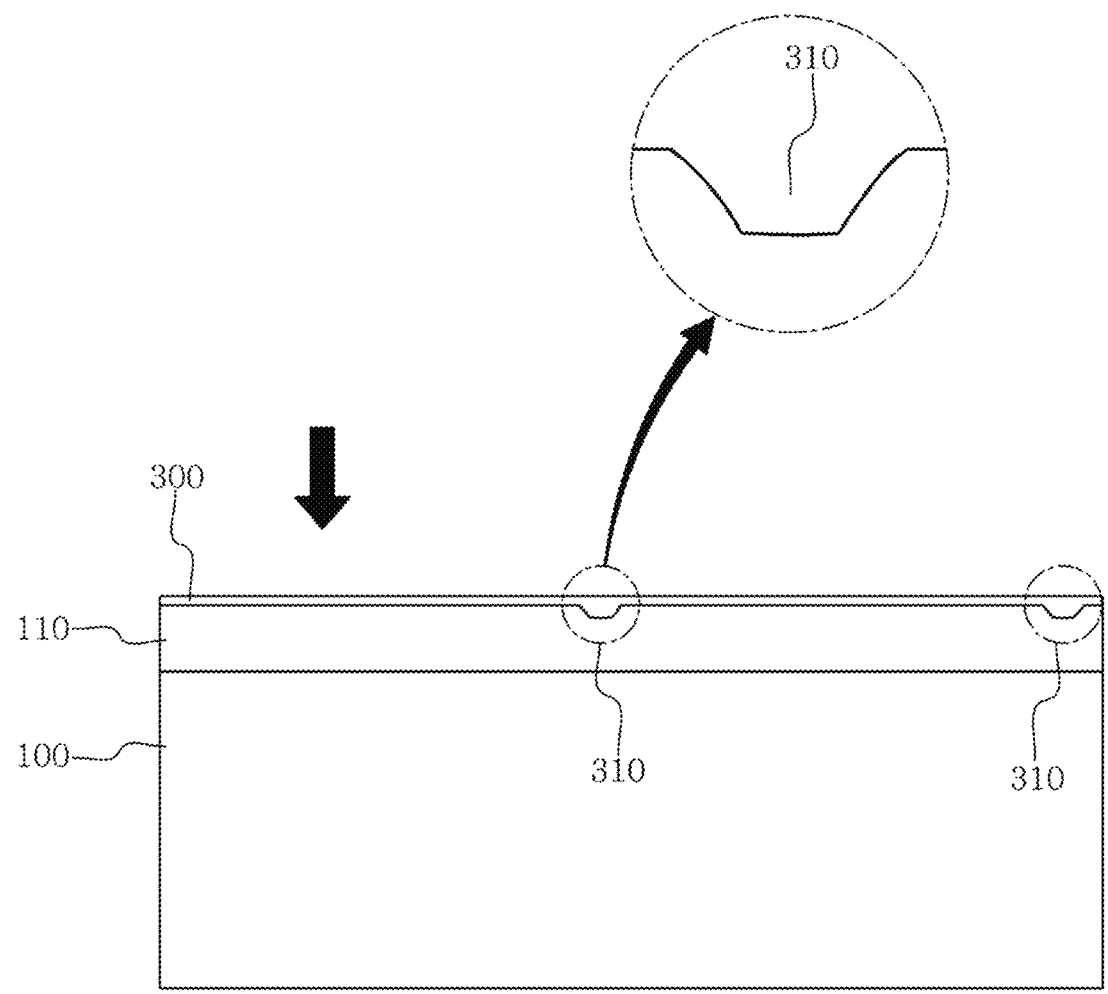
FIGS. 3A and 3B are a cross-sectional view and a top view illustrating the structure of an optical waveguide according to an embodiment of the present disclosure, respectively.
Figure 3B:
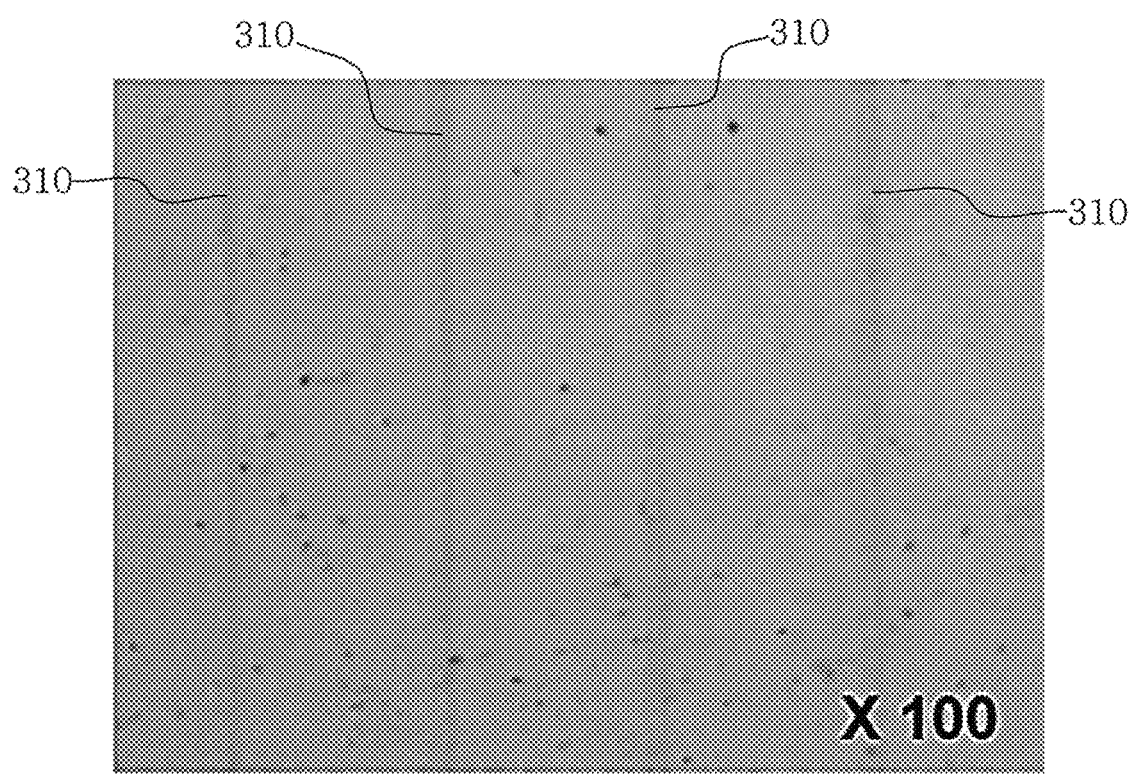

FIGS. 3A and 3B are a cross-sectional view and a top view illustrating the structure of the polymer waveguide according to an embodiment of the present disclosure, respectively.

As shown in FIG. 3A, the groove of the cladding layer 110 has a cross sectional structure for stable single-mode optical propagation. In an embodiment, the groove of the cladding layer 110 has an inverse trapezoidal structure with the upper length longer than the lower length. For example, the core may have an average width of 8.5 μm and an average height of 5 μm, but is not limited thereto.

FIG. 3B is a photographic top image of the polymer waveguide, and as shown in FIG. 3B, the polymer waveguide 10 may include at least one waveguide.

Figure 4:
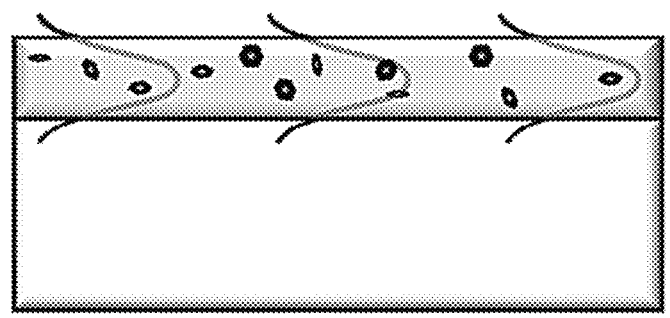
FIG. 4 is a conceptual diagram of interaction between a laser propagating in the waveguide of FIG. 2 and graphene.

FIG. 4 is a conceptual diagram of interaction between a propagating laser and graphene in the waveguide of FIG. 2.

Referring to FIG. 4, the polymer waveguide 10 of FIG. 2 has graphene dispersed and distributed therein. Thus, when a laser propagates in the polymer waveguide 10, the graphene interacts with a field region that is stronger than the evanescent field of the laser propagating in the polymer waveguide 10. The strong field region includes the peak of the field of the propagating laser and/or the surrounding region. Here, the surrounding region has a higher intensity than the intensity of the evanescent field.

Figure 1:
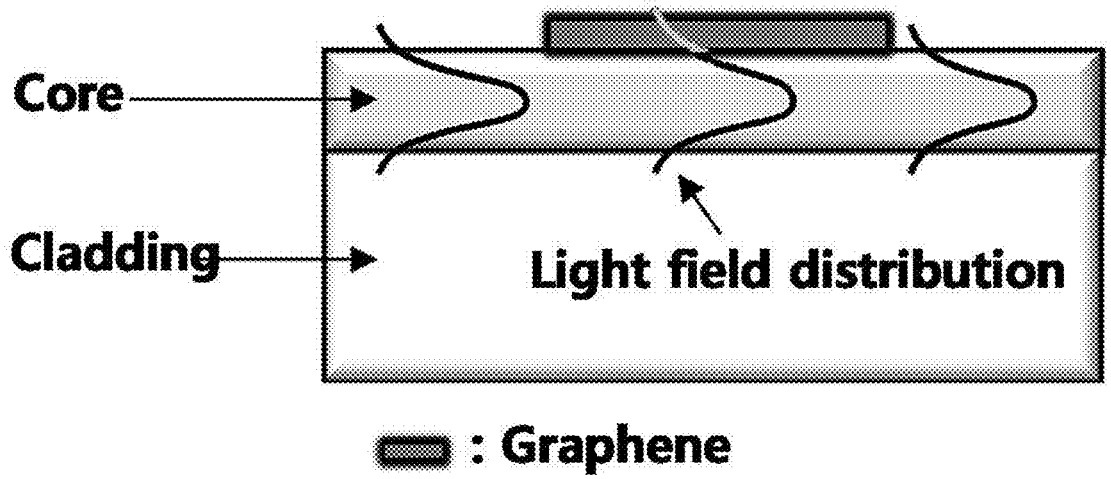
FIG. 1 is a conceptual diagram of interaction between a laser and transferred graphene according to an embodiment of the related art.

The nonlinearity of the device is proportional to the intensity of the light that interacts with graphene. Accordingly, when the same laser propagates, the polymer waveguide 10 of the present disclosure involving interaction by the method of FIG. 4 has higher nonlinearity than the method of FIG. 1 of interaction between the evanescent field having the lower intensity and graphene.

Hereinafter, a method for manufacturing the graphene-dispersed polymer waveguide shown in FIG. 2 will be described in more detail with reference to FIG. 5.

Figure 5:
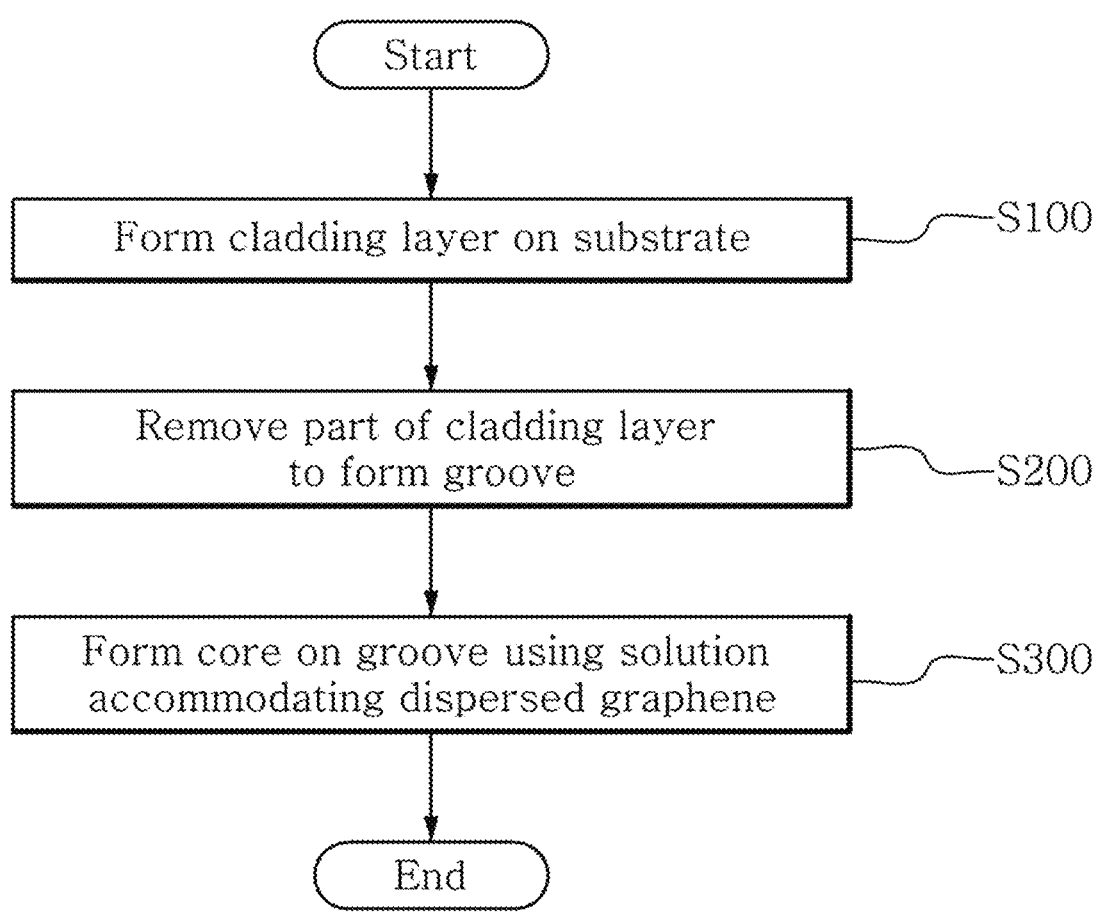
FIG. 5 is a flowchart of a method for manufacturing a graphene-dispersed polymer waveguide according to an embodiment of the present disclosure.
Figure 6:
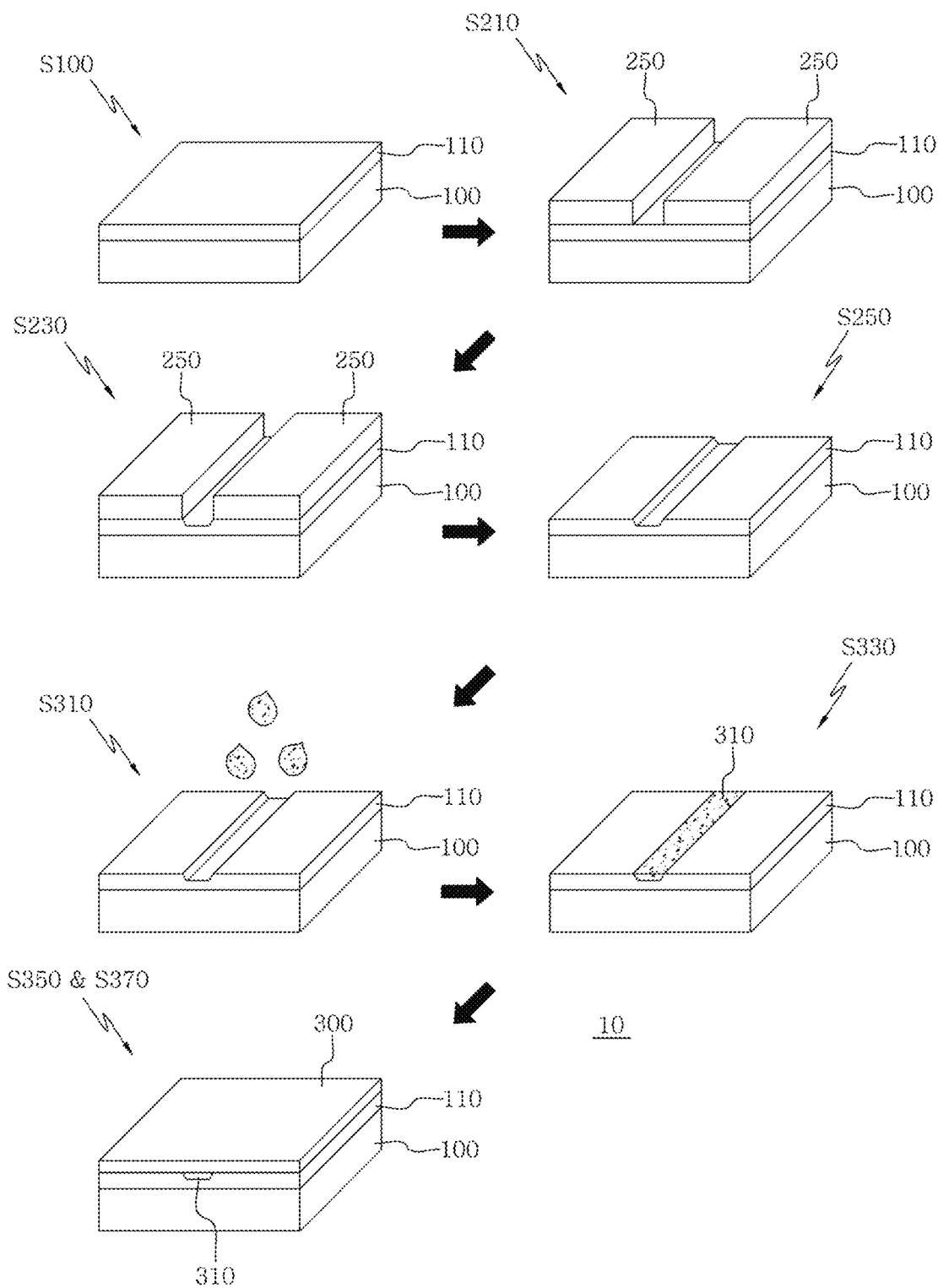
FIG. 6 is a schematic diagram of a method for manufacturing a graphene-dispersed optical waveguide according to an embodiment of the present disclosure.

FIG. 5 is a flowchart of a method for manufacturing a graphene-dispersed polymer waveguide according to an embodiment of the present disclosure, and FIG. 6 is a schematic diagram of a method for manufacturing a graphene-dispersed optical waveguide according to an embodiment of the present disclosure.

Referring to FIG. 5, the method for manufacturing a graphene-dispersed polymer waveguide includes: forming the cladding layer 110 on the substrate 100 (S100); and forming the core 310 accommodating graphene in the waveguide on the groove (S300).

As shown in FIGS. 5 and 6, the cladding layer 110 is formed on the substrate 100 (S100). For example, a first monomer solution comprising a first monomer is coated (for example, spin coated) on the substrate 100, and the coated first monomer is polymerized into a first polymer to form the cladding layer 110 made of the first polymer (S100).

The material (i.e., the first monomer) that forms the cladding layer 110 has a lower refractive index than a material that will form the core 310.

In some embodiments, the coated first monomer solution is cured with ultraviolet (UV) for a predetermined time (for example, approximately 10 minutes) and heated at the temperature (for example, 160° C.) between 150° C. and 200° C. for another predetermined time (for example, approximately 2 hours) to form the cladding layer 110 (S100).

The cladding layer 110 is configured to surround part of the core layer 300 (for example, part of the core 310). To this end, the manufacturing method further includes: after S100, removing part of the cladding layer 110 to form the groove for the waveguide in which a laser propagates (S200).

In an embodiment, as shown in FIG. 6, forming the groove (S200) includes forming a photoresist 250 on the cladding layer 110 (S210); removing part of the cladding layer 110 by etching an exposed region of the cladding layer 110 from the photoresist 250 (S230); and removing the photoresist 250 (S250).

For example, to form the groove, the photoresist 250 is coated (for example, spin coated) on part of the cladding layer 110 and illuminated with UV light for 6 seconds to form the photoresist 250 (S210), and the exposed region of the cladding layer 110 is $O_2$ etched to form the groove (S230). When the groove is formed, the photoresist 250 is removed by a developer (S250).

In S200, the shape of the groove may have an inverse trapezoidal structure as described above with reference to FIG. 3A, but is not limited thereto.

Subsequently, the core 310 is formed on the groove (S300). In some embodiments, a projected area of the core 310 onto the substrate 100 includes at least part of a projected area of the groove onto the substrate 100.

S300 includes: coating (for example, spin coating) a graphene dispersed solution on the groove of the cladding layer 110 (S310); and curing the coated graphene dispersed solution (S330).

In an embodiment, the graphene dispersed solution may be a solution (hereinafter, a "mixed solution") in which a suspension containing dispersed graphene dissolved in an organic solvent is mixed with a second monomer solution.

In S330, the second monomer in the coated graphene dispersed solution is polymerized into a second polymer to form the core 310 made of the polymer.

The organic solvent is a solvent that can dissolve a polar molecule, and may be, for example, dimethylformamide (DMF), but is not limited thereto. The operation of mixing the suspension with the second monomer solution may be performed through mechanical mixing.

Using the mixed solution in which the second monomer is mixed with the dispersed graphene, the polymer waveguide 10 is formed in which that the graphene is dispersed as a filler in a polymer matrix that forms the structure of the core 310.

In some embodiments, the mixed solution is coated to match the height of the groove (S310), and the core 310 that matches the structure of the groove is formed (S330).

Parts of the core layer 300 other than the core 310 may be formed by a variety of methods. In an embodiment, the graphene dispersed solution (i.e., the mixed solution in S310) is coated on parts of the cladding layer 110 other than the groove (S350), and the coated solution is polymerized to form the core layer 300 (S370).

In other embodiment, a monomer solution not including graphene (for example, a solution including only the second monomer) may be coated on parts of the cladding layer 110 other than the groove (S350), and the core layer 300 may be formed (S370).

Accordingly, the core layer 300 including the core 310 is formed on the cladding layer 110. S330 and S370 are similar to S100 of polymerizing a monomer into a polymer to form a layer made of the polymer, and its detailed description is omitted herein. In S100 and S330, the curing temperature is between 150° C. and 200° C. (for example, 160° C.). As described above, the polymer waveguide 10 is manufactured through a low temperature treatment process. As a result, graphene crystals in the waveguide are not damaged and have high crystal quality.

The dispersed state of graphene in the core 310 depends on the concentration of graphene dissolved in the suspension. In an embodiment, the mixed solution is configured to have the graphene concentration at which agglomeration and/or precipitation of the dissolved graphene is prevented and graphene is kept in a dispersed state.

Figure 7A:
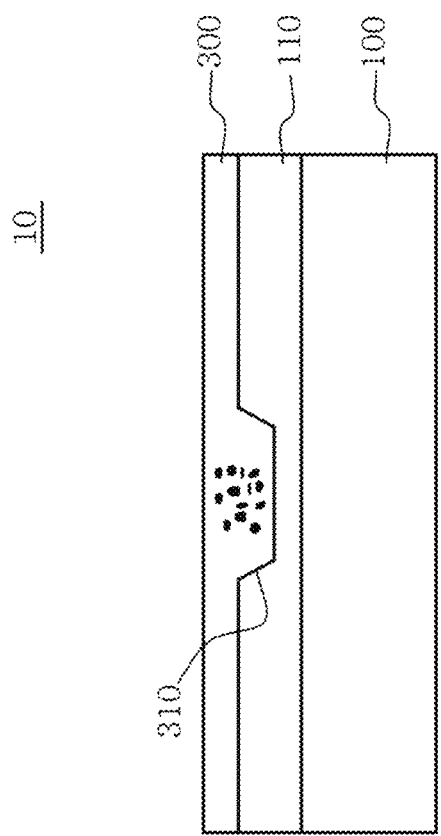
FIGS. 7A and 7B are diagrams illustrating the dispersed states as a function of graphene concentration according to an embodiment of the present disclosure.
Figure 7A:
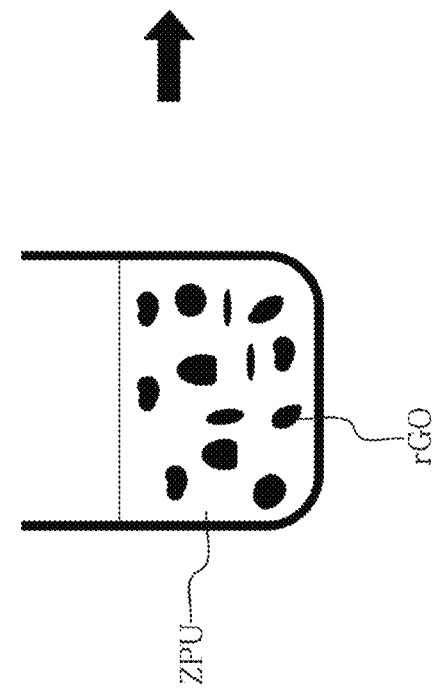
Figure 7B:
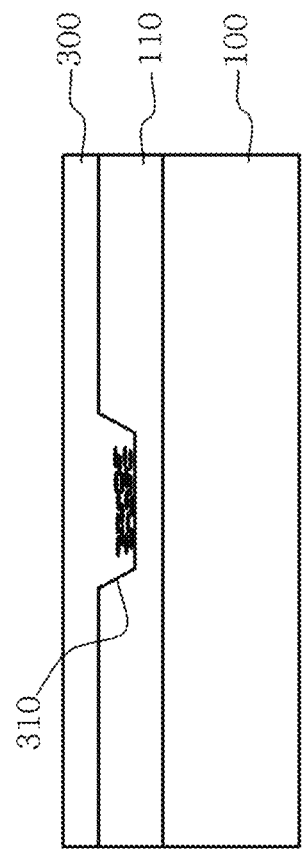

FIGS. 7A and 7B are diagrams illustrating the dispersed state as a function of graphene concentration according to an embodiment of the present disclosure.

When the concentration of graphene dissolved in the suspension is too high, agglomeration and/or precipitation of graphene occurs as shown in FIG. 7A.

When the core layer 300 is formed in an agglomerated state of graphene as shown in FIG. 7A, the agglomerated graphene is located at the core 310 within the waveguide. Thus, the propagation of an optical signal traveling in the core 310 is obstructed by the agglomerated graphene. When the extent of agglomeration is severe, the propagation of the optical signal may be blocked like the blood circulation in the blood vessel having arterial sclerosis.

In contrast, when the concentration of graphene dissolved in the suspension is on a level at which agglomeration and/or precipitation does not occur, graphene is dissolved in the form of flakes, and is dispersed in the suspension as shown in FIG. 7B.

When the core layer 300 is formed in a dispersed state of graphene in the form of flakes, the graphene flakes are distributed in the polymerized polymer while keeping them dispersed as shown in FIG. 7B. Thus, propagation of an optical signal interacting with the graphene is not obstructed.

The graphene dispersed solution has a graphene concentration at which graphene is kept in a dispersed state. The graphene concentration is any concentration lower than the threshold concentration at which agglomeration and/or precipitation of graphene dissolved in the suspension occurs. In an embodiment, the threshold concentration may be any concentration in the range of $0.95 \times 10^{-3}$ wt % to $1.05 \times 10^{-3}$ wt %. For example, the threshold concentration may be $1 \times 10^{-3}$ wt %. In the above example, the graphene dispersed solution has the graphene concentration of less than $1 \times 10^{-3}$ wt %, for example, $9 \times 10^{-4}$ wt %, so that graphene may be kept in a dispersed state.

However, when the graphene dispersed solution has too low graphene concentration, graphene that will interact with a laser is located in small quantities within the core of the polymer waveguide. When such a polymer waveguide 10 is used, a laser that does not satisfy a user's desired nonlinear property is outputted. Accordingly, it is necessary that graphene which will interact with a laser should be included in the waveguide on an appropriate scale.

Additionally, when the graphene dissolved in the suspension is polymerized into a polymer, the refractive index of the core 310 is maintained without a great change and maintains a higher value than the refractive index of the cladding layer 110.

Figure 8:
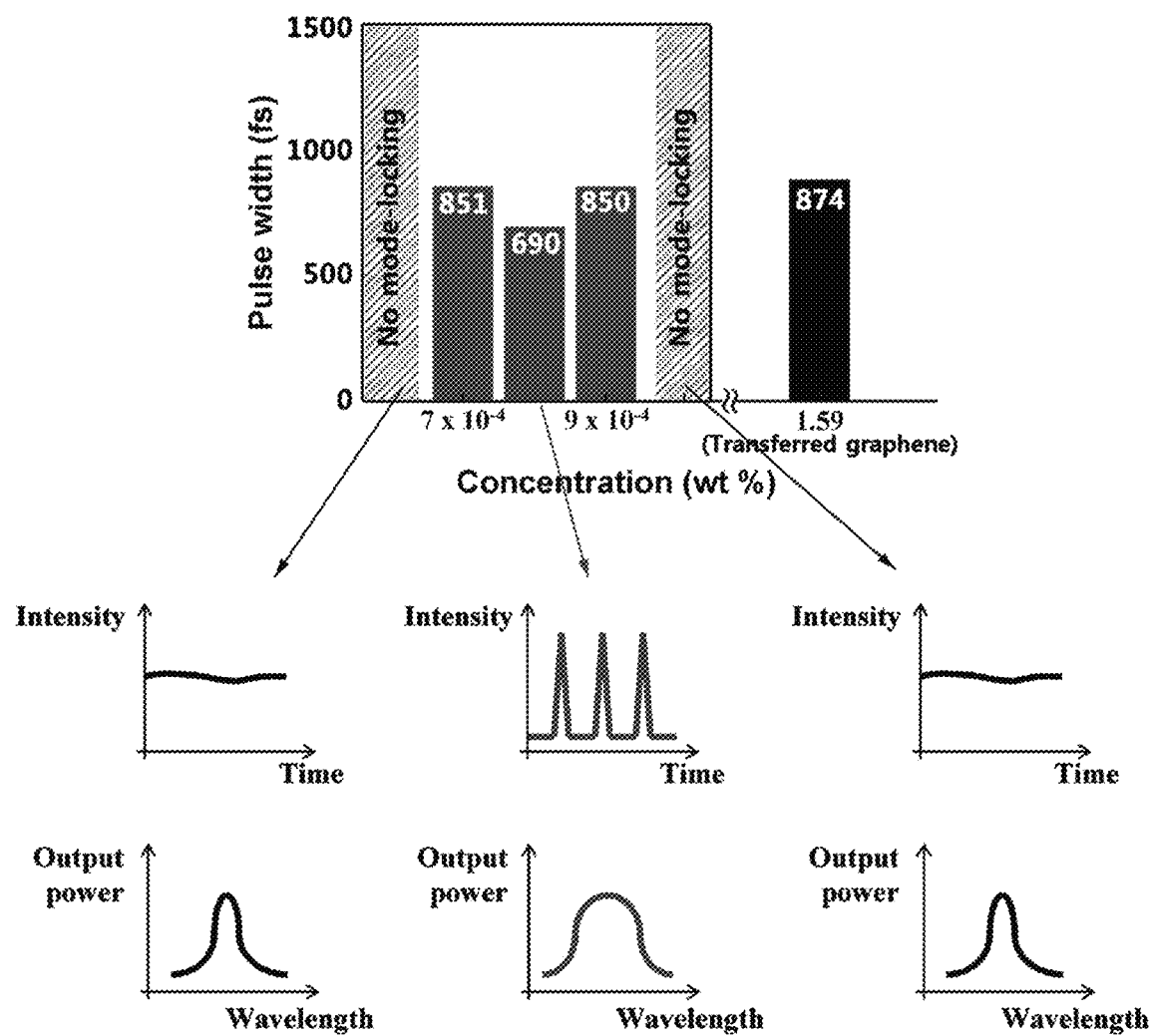
FIG. 8 is a diagram illustrating the nonlinear property of an optical waveguide as a function of graphene concentration according to an embodiment of the present disclosure.

FIG. 8 is a diagram illustrating the nonlinear property of the optical waveguide as a function of graphene concentration according to an embodiment of the present disclosure.

Referring to FIG. 8, when the concentration of graphene in the suspension is $7\times10^{-4}$ or above and $9\times10^{-4}$ wt % or less, a continuous laser is converted to and outputted as a pulsed laser by interaction with graphene in the polymer waveguide while traveling along the core of the polymer waveguide. Additionally, this graphene concentration corresponds to a graphene concentration for preventing the refractive index of the second polymer that forms the core 310 from reducing below the refractive index of the first polymer that forms the cladding layer 110, thereby allowing the core 310 to function as an optical waveguide.

As shown in FIG. 8, the pulse formation of the laser propagating along the polymer waveguide 10 is not achieved when the concentration of graphene dissolved in the suspension is less than $7\times10^{-4}$ wt %. It is because less interaction between the propagating laser and the graphene occurs due to the very low graphene concentration.

Additionally, the laser pulse formation through the polymer waveguide is not achieved when the concentration of graphene dissolved in the suspension exceeds $9\times10^{-4}$ wt %. It is because agglomeration and/or precipitation of graphene occur in the suspension and the propagation of the laser is obstructed. The agglomeration will be described in more detail with reference to FIG. 13 below.

As described above, the polymer waveguide 10 needs to be formed with the graphene concentration that is lower than the threshold concentration to ensure dispersion stability for maintaining the dispersed state, and further, at which an optical signal having a user's desired level of nonlinear property is outputted.

In addition, an adhesion promoter may be coated to increase the adhesion between the stacked layers in some or all of S100 to S300.

For example, after the adhesion promoter is coated on the substrate 100, the first monomer solution for forming the cladding layer 110 is coated. Alternatively, the photoresist 250 may be formed on the cladding layer 110. Alternatively, the second monomer solution for forming the core layer 300 is coated on the cladding layer 110 having the groove (S300).

In addition, in S300, when graphene is reduced graphene oxide (rGO), the second monomer of the mixed solution is polymerized into a second polymer and the mixed solution is photopolymerized to restore the disrupted $sp^2$ bonds in the dissolved rGO. Thus, the mixed solution is polymerized into a polymer through photopolymerization to form the core 310, thereby obtaining the core 310 having a higher non-linear property than the nonlinear property of graphene before polymerization.

Figure 9A:
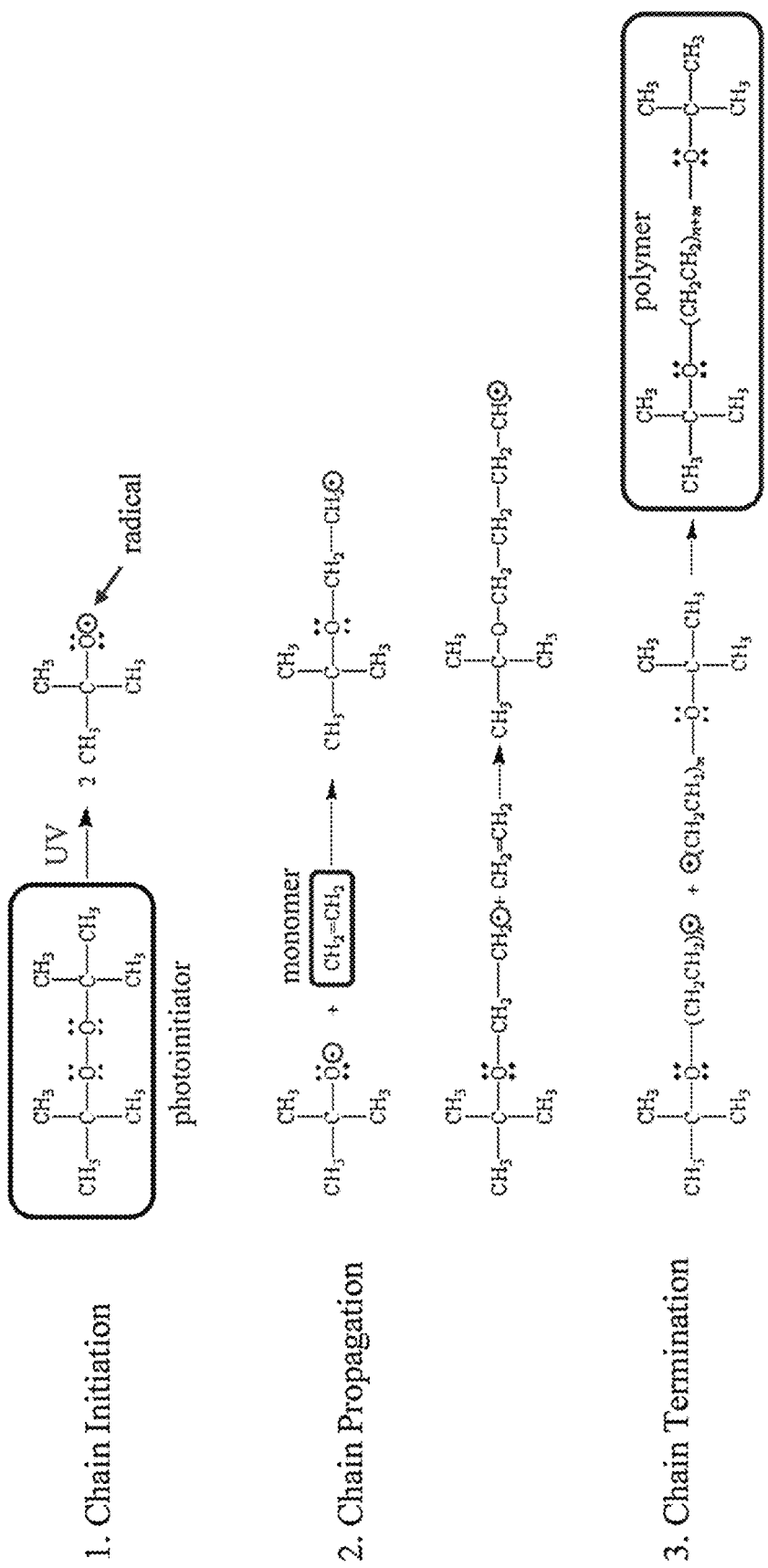
FIGS. 9A to 9C are diagram illustrating photopolymerization that increases nonlinearlity of a polymer waveguide according to an embodiment of the present disclosure.
Figure 9B:
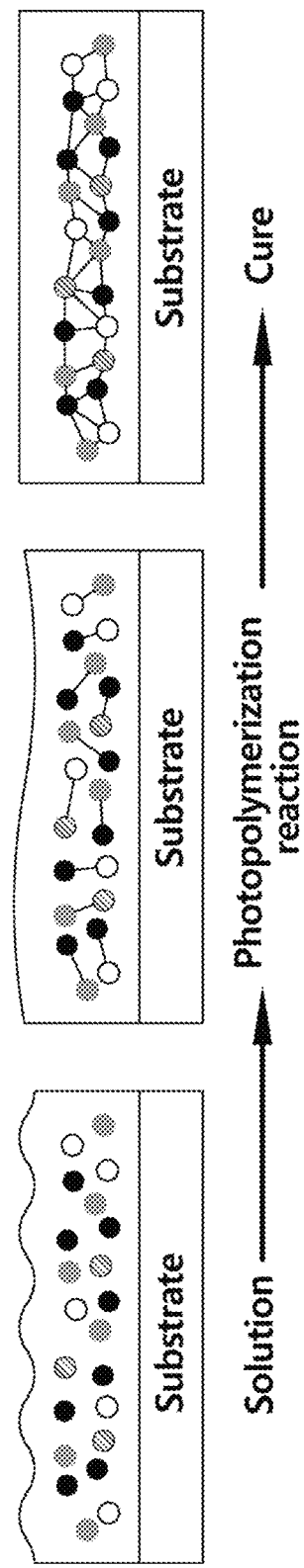
Figure 9C:
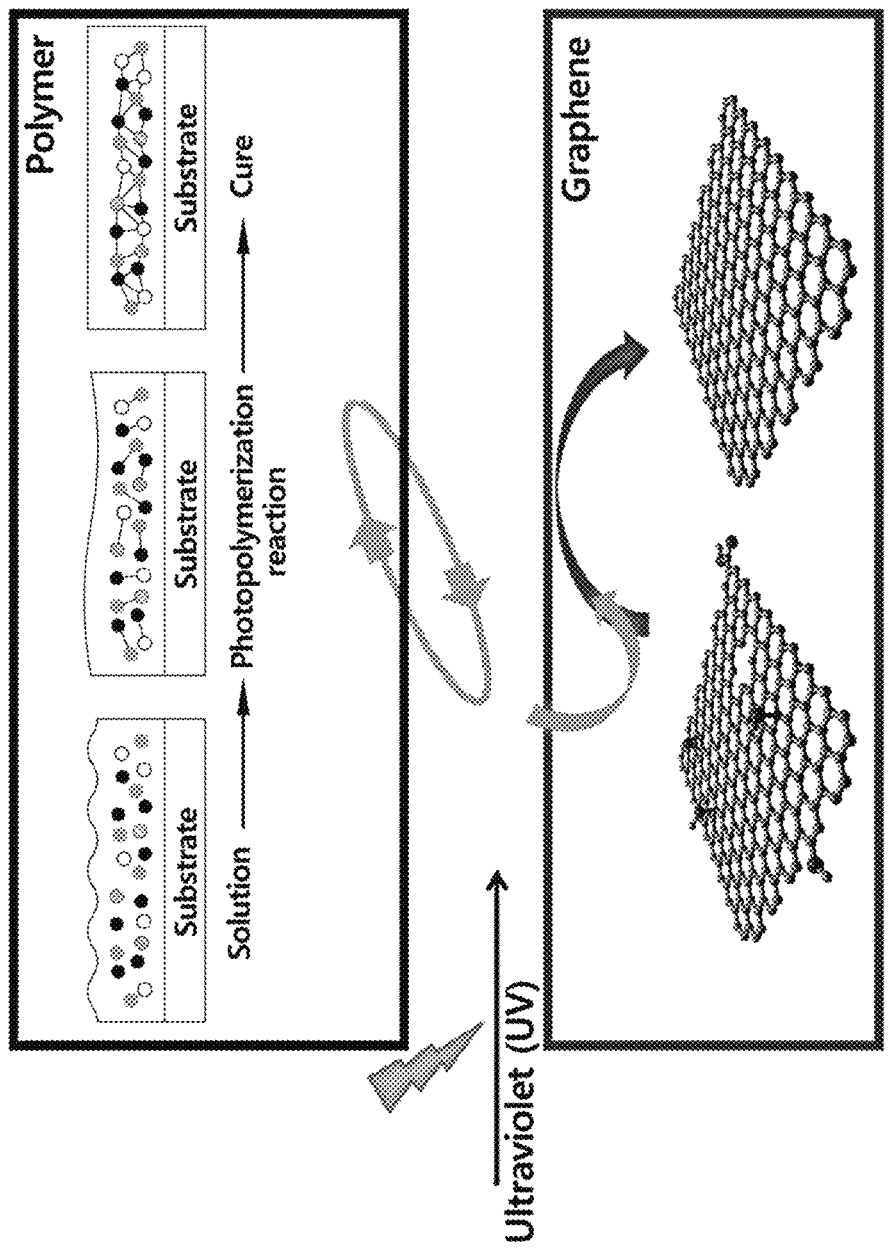

FIGS. 9A to 9C are diagram illustrating photopolymerization that increases nonlinearlity of the polymer waveguide according to an embodiment of the present disclosure.

FIG. 9A is a diagram illustrating photopolymerization. The photopolymerization is a polymerization method using polymerization reaction that occurs by illumination of light, and performs chain polymerization by generating radicals upon energy supply by light rather than heat during reaction. To initiate photopolymerization, a radical source is necessary. When a photoinitiator is decomposed by UV absorption, a pair of radicals including unpaired electrons is formed (Chain initiation). The generated radical is a radical of an initiator that forms a new radical when the radical adds to a monomer. The reaction product that forms the new radical may be continuously polymerized with other monomers (Chain propagation). Subsequently, each pair of radicals forms a covalent bond, and eventually this reaction is terminated.

After the photopolymerization, the monomer in a liquid state turns into a solid state as shown in FIG. 9B.

Meanwhile, as shown in FIG. 9C, rGO has a bonding structure of functional groups by partial disruption of the $sp^2$ bonding network of graphene by the reduction reaction. When the rGO is dissolved in a monomer solution to be photopolymerized, the radical of the initiator produced by reaction with UV reacts with a monomer to produce a polymer, and also react with the rGO. Then, the bonded functional groups are removed, and eventually, as shown in FIG. 9C, the disrupted $sp^2$ bonds are restored before photopolymerization. Accordingly, when the core layer 300 is formed through photopolymerization using the monomer solution including the rGO, the core having higher nonlinearity than the rGO before photopolymerization as a solute itself may be obtained. It will be described in more detail with reference to FIG. 12 below.

The above-described method for manufacturing an optical waveguide according to FIGS. 4 and 5 does not require a process of manufacturing a silicon (Si) based waveguide since it manufactures a polymer waveguide. Additionally, a deposition process and a transfer process are not required to install graphene in the waveguide. Instead, a simple process such as a coating process is required. Also, graphene in large quantities is not required.

In contrast, Si based waveguides are manufactured by a complicated process (such as, for example, E-beam or UV lithography) at high costs.

Additionally, when a deposition process through the chemical vapor deposition (CVD) technique is included, design complexity increases. It is because there is a big difference between the final refractive index of the core 310 and the refractive index of the polymer in the core 310 with the increasing graphene content.

As a result, there are advantages: a simple manufacturing process, a low cost and low design complexity. Furthermore, graphene is not attached to the outside (for example, the surface) of the waveguide 10 manufactured according to the embodiments of the present disclosure. Accordingly, spatial adaptation and utilization are higher than when graphene is transferred onto the surface. Further, graphene is not damaged by the external environment, and nonlinearity is maintained for a long term.

The polymer waveguide containing dispersed graphene, manufactured as above is an optical waveguide, and may be used in a wide range of optical waveguide-based system applications.

Figure 10:
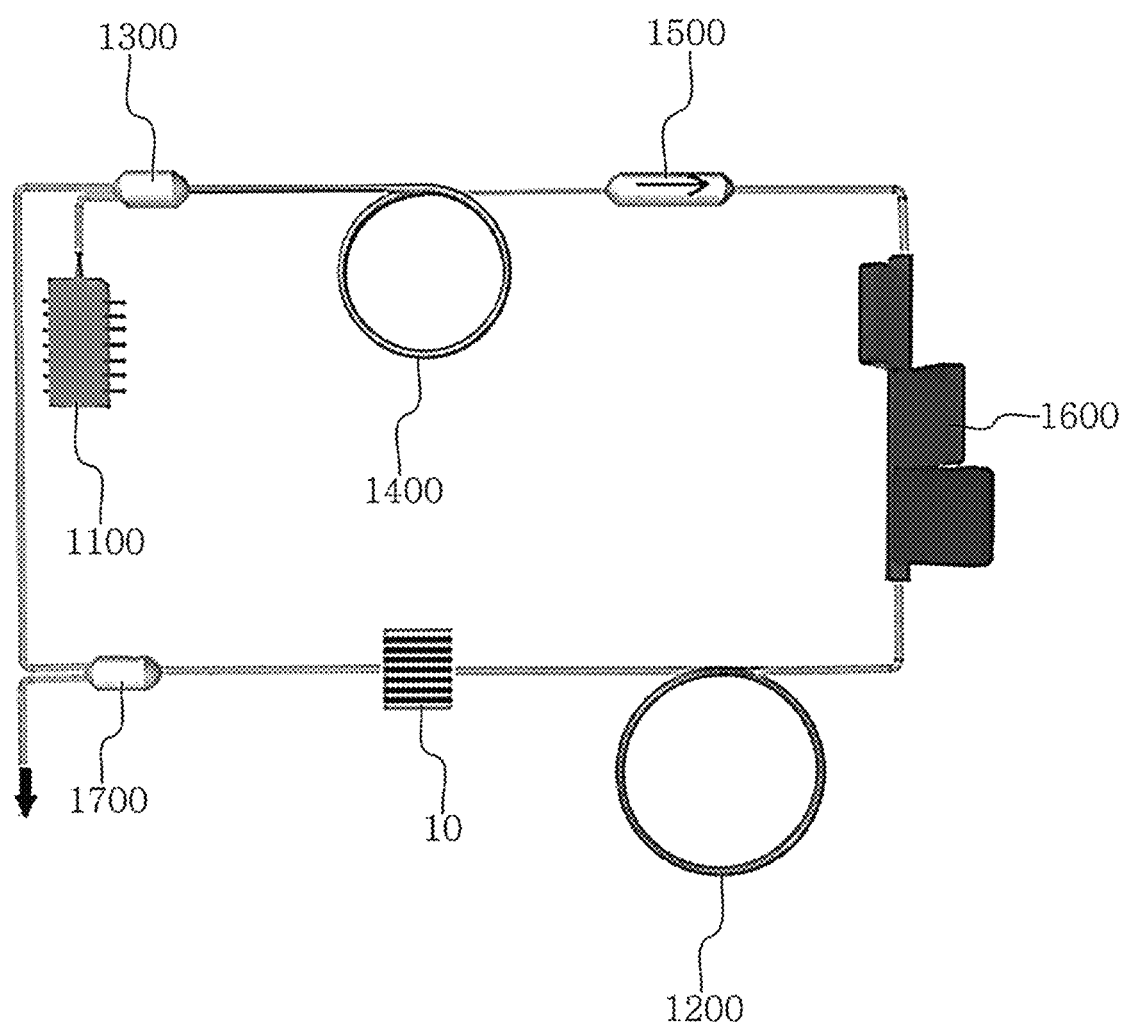
FIG. 10 is a conceptual diagram of a passively mode-locked laser system including the polymer waveguide of FIG. 2 according to an embodiment of the present disclosure.

FIG. 10 is a conceptual diagram of a passively mode-locked laser system including the polymer waveguide of FIG. 2 according to an embodiment of the present disclosure.

Referring to FIG. 10, the passively mode-locked laser system 1000 includes an optical fiber 1200 to balance the chromatic dispersion value and the nonlinearity in the laser cavity. An amplified gain produced from the laser cavity 1100 interacts with the polymer waveguide 10 to produce a laser pulse during the iterative propagation in the laser cavity. In an embodiment, the system 1000 may further include at least one of a wavelength division multiplexer 1300, an amplifier 1400, an isolator 1500, a polarization controller (PC) 1600, and a coupler 1700. Each component 10, 1100, 1300, 1400, 1500, 1600, 1700 is optically connected through the optical fiber 1200.

The laser cavity 1100 may include a pump laser diode (Pump LD), but is not limited thereto, and may include a variety of solid lasers such as ruby, neodymium-doped yttrium aluminum garnet (Nd:Y3Al5O12 Nd:YAG), Neodymium glass (Nd:Glass) or Ti:Sapphire.

The wavelength division multiplexer 1300 is connected to the laser cavity 1100. to generate the gain in the amplifier 1400.

The optical fiber 1200 forms a laser cavity, and at least one optical device is connected to the cavity. The optical fiber 1200 includes a core through which a laser passes and a cladding that surrounds the core. For example, the optical fiber 1200 may be a single mode fiber (SMF), and the remaining optical fiber after connecting the components may be wound on a necessary space.

The amplifier 1400 provides a gain into the laser cavity using energy from the laser cavity 1100 and transmitted from the wavelength division multiplexer 1300. For example, an Er-doped fiber amplifier (EDFA) may be used as the amplifier 1400.

The isolator 1500 is connected to the amplifier 1400, and prevents the backflow of the laser. That is, the isolator 1500 controls the laser to flow in only one direction in the laser cavity.

The polarization controller 1600 is connected to the polymer waveguide 10, and controls the polarization state of the laser.

The coupler 1700 splits the laser to output part of the laser. For example, the coupler 1700 may split the laser at a ratio of 90:10 to output 10% of the laser and transmit 90% of the laser to the polymer waveguide 10.

The optical energy amplified by the amplifier 1400 forms a continuous wave laser using the energy transmitted from the laser cavity 1100. The graphene dispersed in the polymer waveguide 10 performs nonlinear interaction such as saturable absorption with the inputted continuous wave laser to produce a laser pulse. The laser pulse is outputted and repeatedly amplified through the amplifier 1400 during circulation and propagation, thereby producing a laser pulse of high output.

Figure 11:
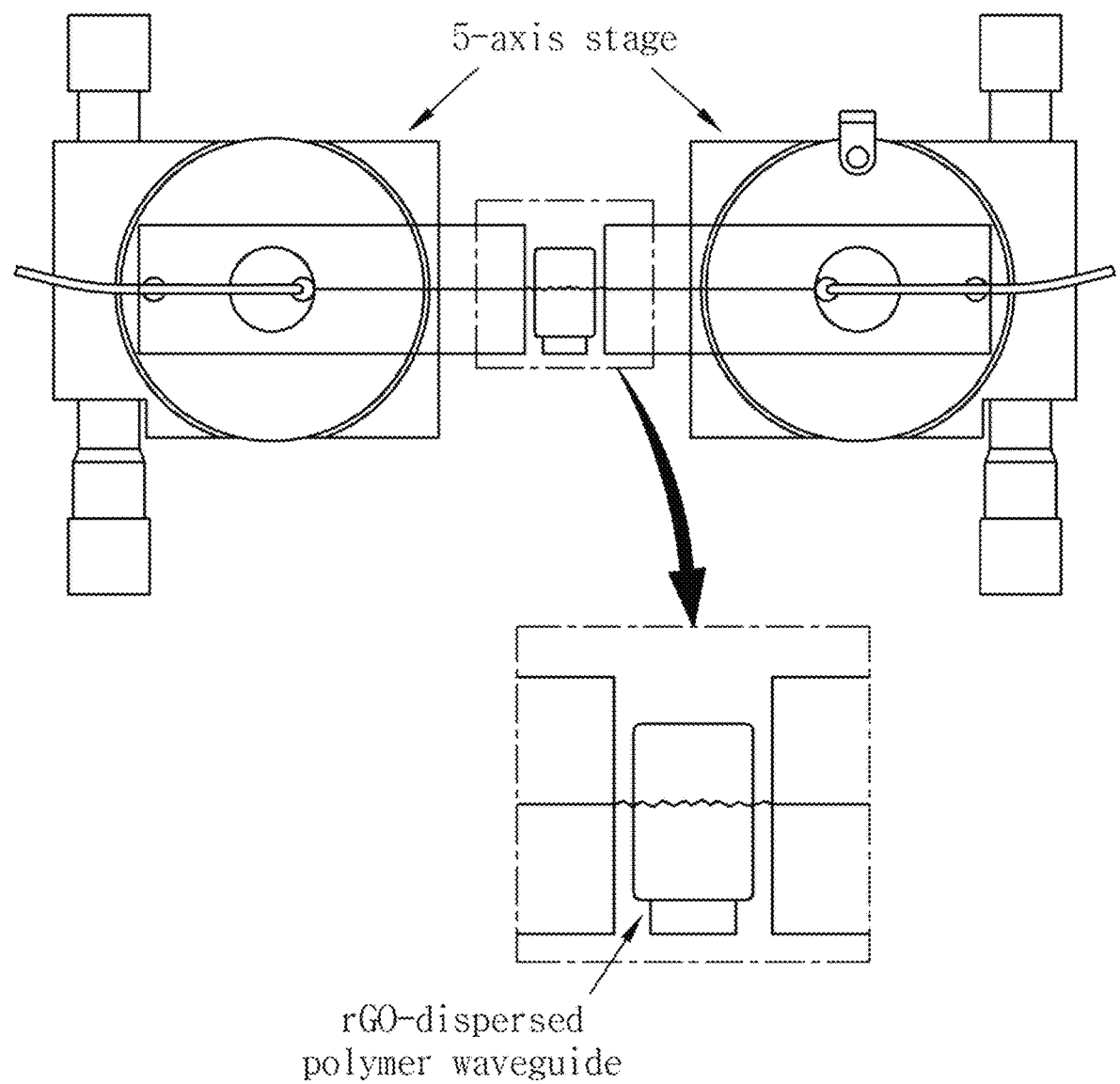
FIG. 11 is an image showing a laser that propagates in the optical waveguide of FIG. 10 and interacts with graphene in the optical waveguide.

FIG. 11 is an image showing a laser that propagates in the optical waveguide of FIG. 10 and interacts with graphene in the optical waveguide.

As shown in FIG. 11, a continuous wave laser is converted to a pulsed laser through the polymer waveguide 10. As such, the polymer waveguide 10 may be applied to mode-locked lasers.

Experimental Example

FIGS. 12 to 15 are diagrams illustrating an experiment for the manufacturing method of FIG. 4 according to an experimental example of the present disclosure.

These experimental examples use part or all of a suspension containing 0.2 mg/mL of graphene in which rGO is dissolved in DMF (1 mL).

FIGS. 12A to 12D are diagrams illustrating the characteristics of graphene in the manufacturing process according to the experimental example of the present disclosure. In the experimental example of FIG. 12, the suspension is drop cast on a Si wafer and dried under a vacuum for 2 hours to remove DMF, and the characteristics of graphene are analyzed.

Figure 12A:
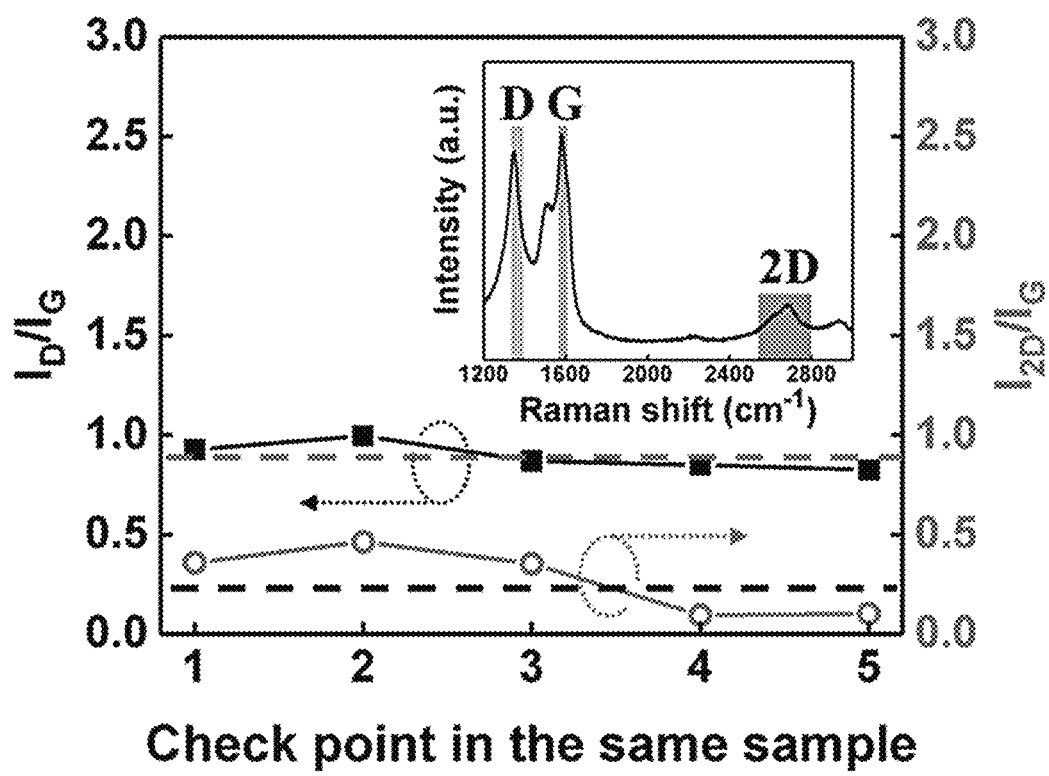
FIGS. 12A to 12D are diagrams illustrating the characteristics of graphene (rGO in this case) before being incorporated into the waveguide according to an experimental example of the present disclosure.

FIG. 12A shows the results of values of ID/IG and values of I2D/IG of rGO measured at different points in the same sample by Raman spectroscopy. The red dotted line indicates an average of ID/IG, and the black dotted line indicates an average of I2D/IG (0.893 and 0.274 respectively). The size of graphene included in the suspension may be calculated based on FIG. 12A. The size of graphene is calculated by the following equation.

$$L_a = (2.4 \times 10^{-10} \text{ nm}^{-3})\lambda^4 \left(\frac{I_D}{I_G}\right)^{-1} \quad \text{[Equation 1]}$$

Here, La denotes the grain size and the measured value (533 nm) of excitation wavelength respectively. Based on Equation 1, the graphene in the suspension has the size of 18.705 nm on the average, and when the graphene is kept in a dispersed state without agglomeration and/or precipitation, propagation of an optical signal is not obstructed.

Figure 12B:
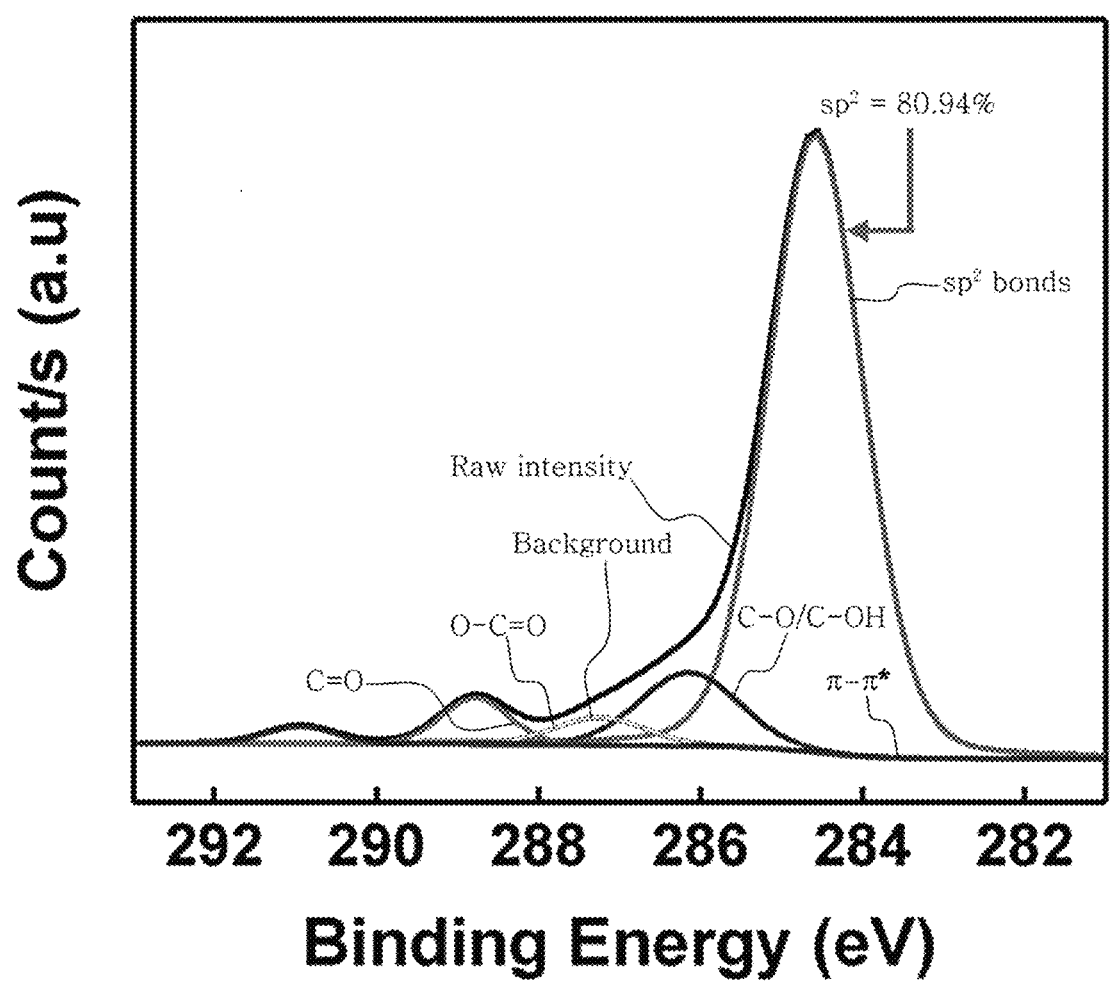

FIG. 12B shows analysis results of rGO by X-ray photoelectron spectroscopy (XPS). The $sp^2$ content is 80.94% that is a high value enough to perform a laser mode-locked operation.

Figure 12C:
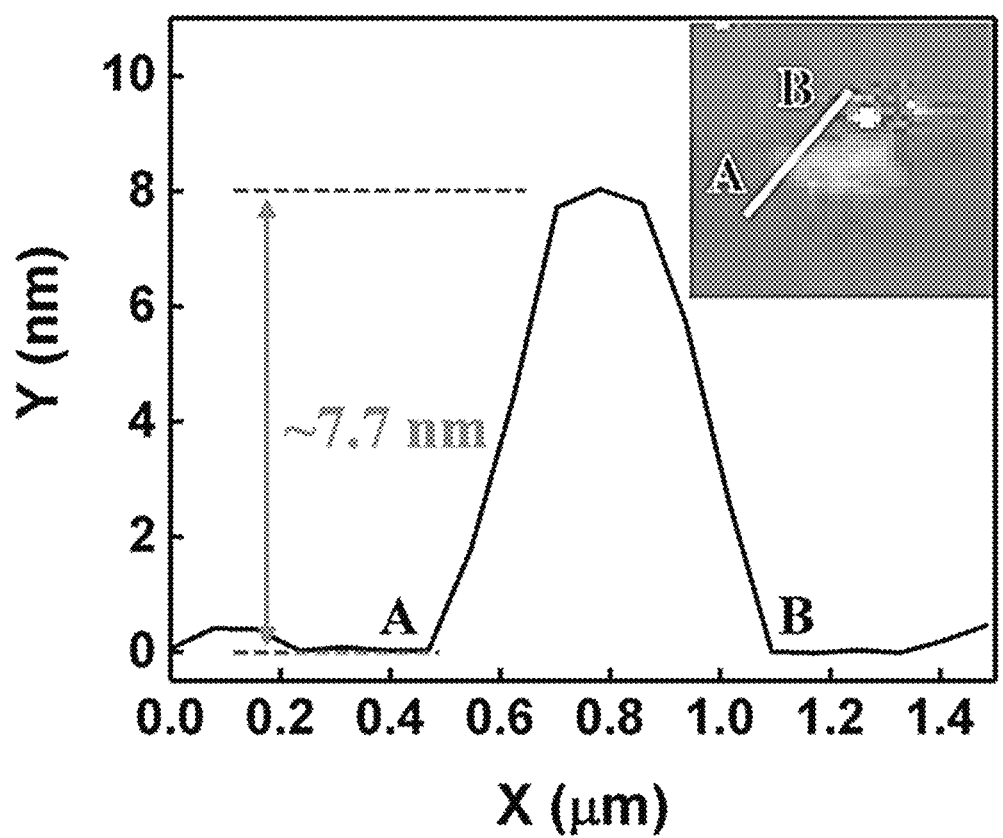
Figure 12D:
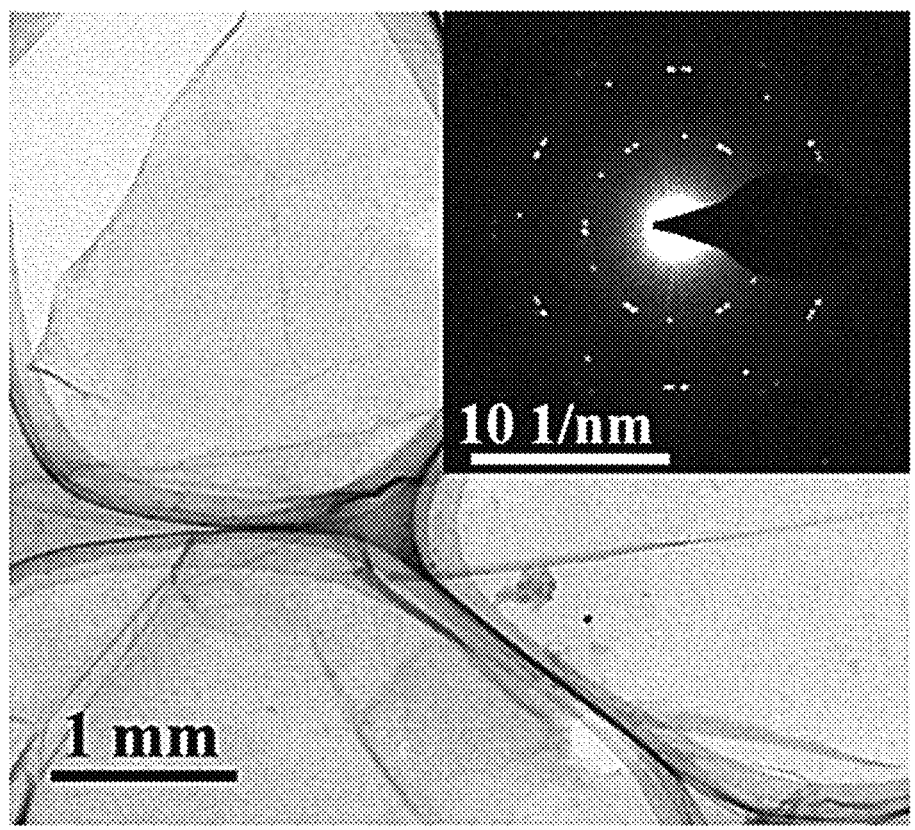

Referring to FIG. 12C, the rGO particles in the suspension are approximately 7 nm (7.7 nm) in thickness, and the rGO has a structure of few layers. This is supported by the TEM image shown in FIG. 12D. Referring to FIG. 12D, it is found that the nanostructure of the rGO on the TEM image has few layers.

Figure 13:
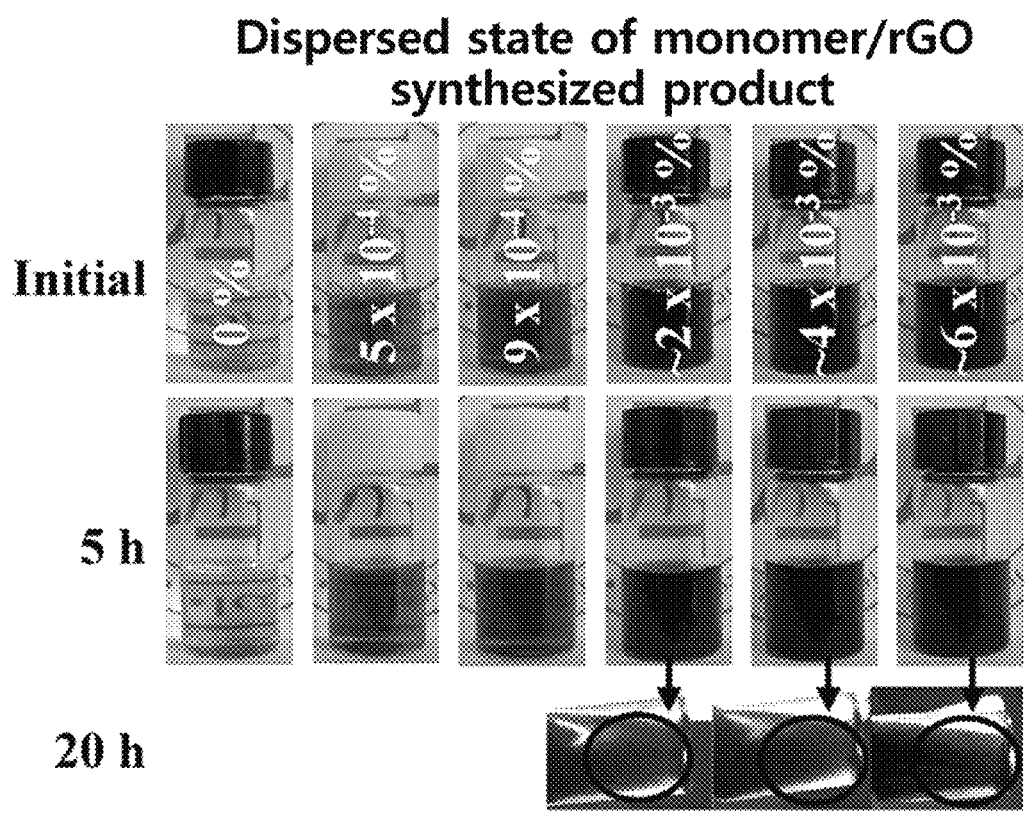
FIG. 13 is an image showing the dispersed state as a function of graphene concentration according to an experimental example of the present disclosure.

FIG. 13 is an image showing the dispersed state as a function of graphene concentration according to the experimental example of the present disclosure. In the experimental example of FIG. 13, part (0.04-0.36 mL) of the suspension containing rGO dissolved in DMF, stored for 5 hours, is mechanically mixed with 8 g of polymer (perfluorinated acrylic polymer ZPU12-455 from Chem optics) and is dispersed in the polymer solution.

Referring to FIG. 13, the dispersed state of graphene dissolved in the polymer solution is differently exhibited depending on the concentration. When the graphene concentration is equal to or higher than the threshold concentration (for example, $2 \times 10^{-3}$ w %), agglomeration and/or precipitation occurs, and dispersion stability in polymer reduces. As such, when the polymer waveguide is formed in a non-dispersed state of graphene, propagation of an optical signal is obstructed.

On the contrary, when the graphene concentration is lower than the threshold concentration (for example, $9 \times 10^{-4}$ wt % or less), dispersion stability is maintained even after the lapse of 20 hours. In this state, propagation of an optical signal is not obstructed.

Figure 14A:
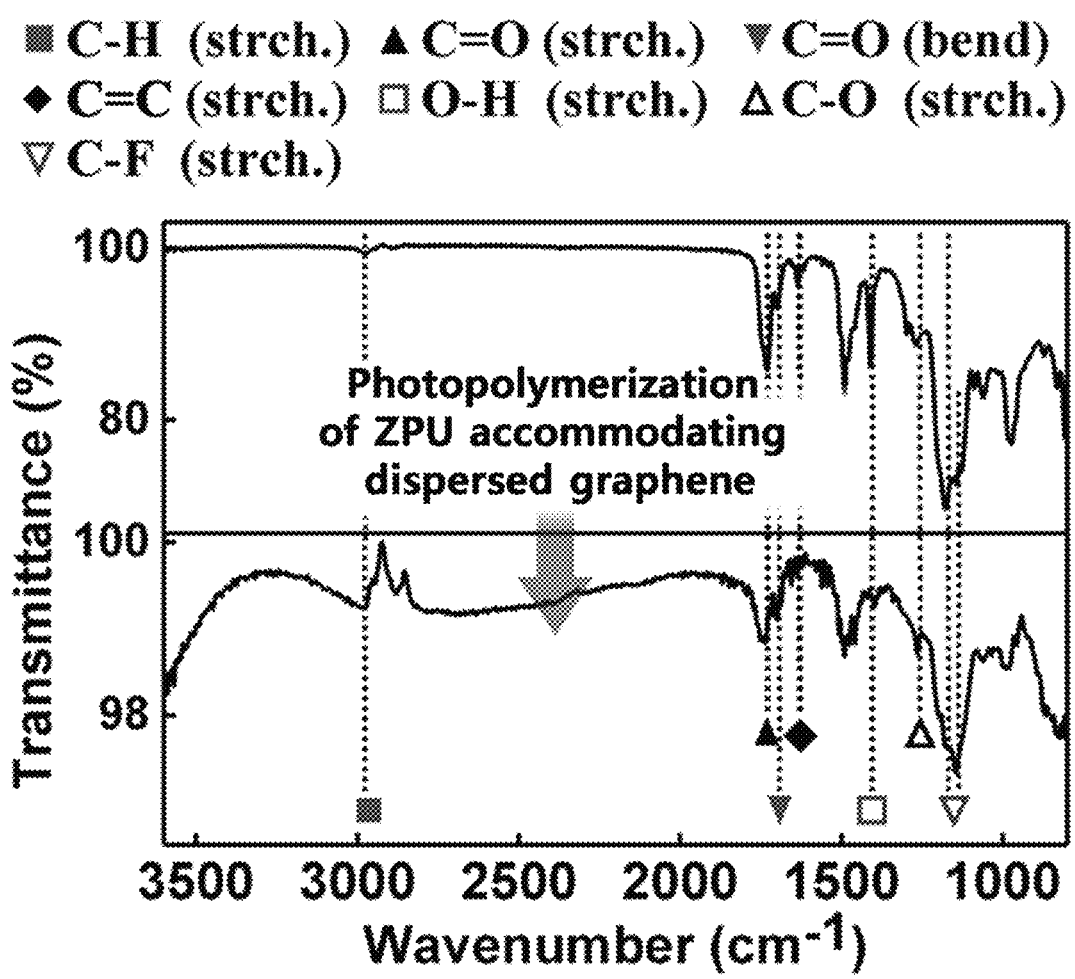
FIGS. 14A and 14B are diagrams illustrating the characteristics of a polymer waveguide incorporating rGO formed through photopolymerization according to an experimental example of the present disclosure.
Figure 14B:
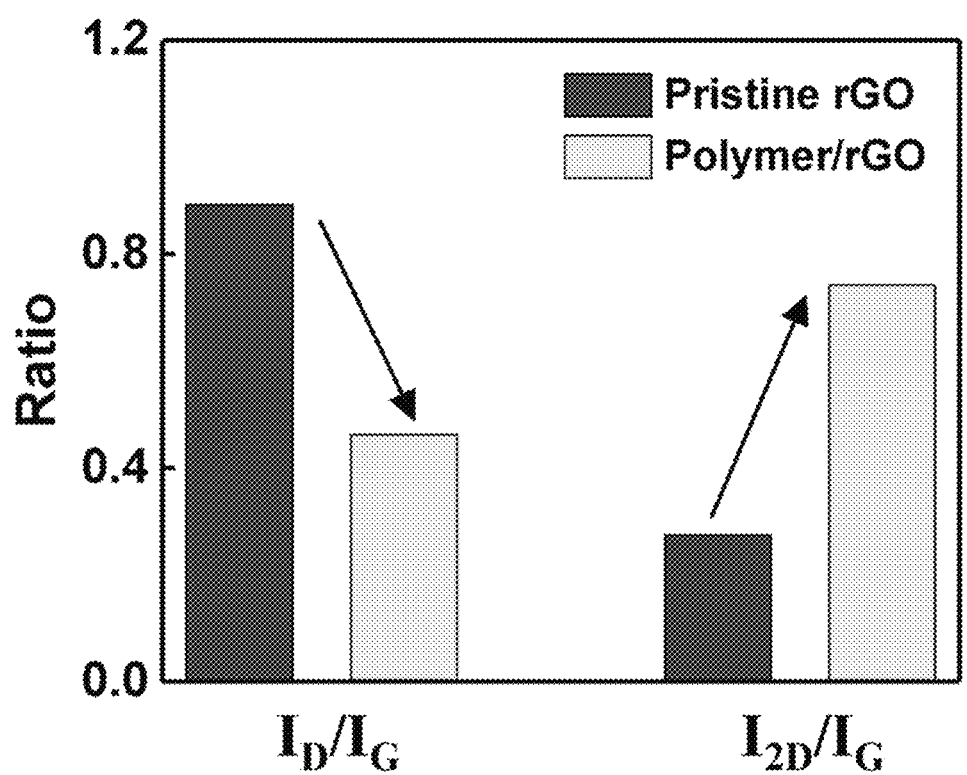

FIGS. 14A and 14B are diagrams illustrating the characteristics of the polymer waveguide formed through photopolymerization according to the experimental example of the present disclosure.

In this experimental example, ZAP1020 as an adhesion promoter is spin coated on a silicon (Si) wafer, and a first monomer solution (ZPU12-450) is spin coated, cured with UV for 10 minutes and heated in an oven at 160° C. for 2 hours to form a cladding layer 110 (S100). Additionally, patterning is performed on the cladding layer 110 by photolithography 150 (S200). In detail, CLARIANT AZ9260 is spin coated, and illuminated with UV for 60 seconds (S210), and subsequently, the exposed cladding layer 110 is 02 etched by $O_2$ reactive ion etching (RIE) (S230), and the remaining photoresist 250 is removed by MIF400 as a developer. Additionally, a mixed solution in which a graphene dispersed suspension is mixed with a second monomer solution (ZPU12-455) is spin coated on a groove, cured with UV for 10 minutes and heated at 160° C. for 2 hours to form a target polymer waveguide (S300).

Referring to FIG. 14A showing FT-IR transmission spectrum of the ZPU/rGO mixed solution, it is found that the peak of C=C bond disappear after curing. That is, the mixed solution having the graphene concentration of $9 \times 10^{-4}$ wt % is successfully polymerized into a polymer.

In FIG. 14B, when comparing the values of ID/IG and I2D/IG before mixing the second monomer solution with rGO and the values after mixing the second monomer solution with rGO, it is found that the value of ID/IG indicating defects in the graphene structure decreases, and the value of I2D/IG indicating the restoration of $sp^2$ bonds increases. That is, as described above with reference to FIG. 9, when the monomer solution containing rGO is polymerized into a polymer, the nonlinear property of graphene in the polymer is improved as supported by FIG. 14B.

Figure 15A:
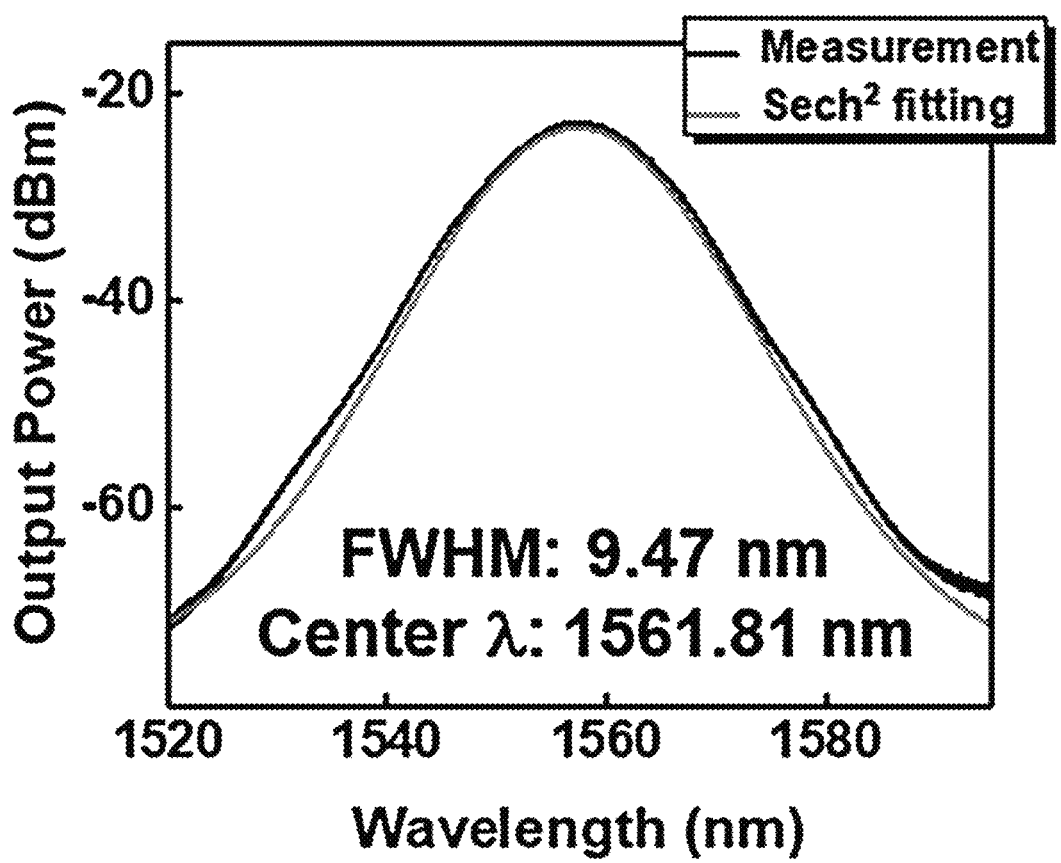
FIGS. 15A to 15C are diagram showing the characteristics of a pulsed laser generated by a passively mode-locking by interaction according to an experimental example of the present disclosure.
Figure 15B:
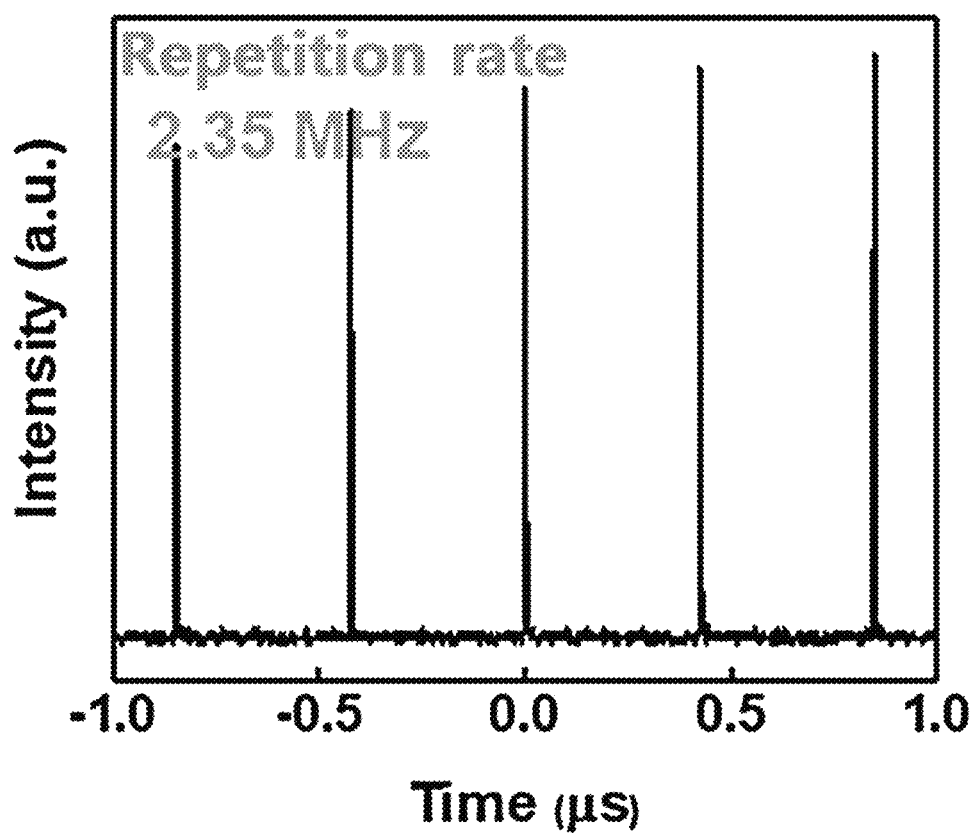
Figure 15C:
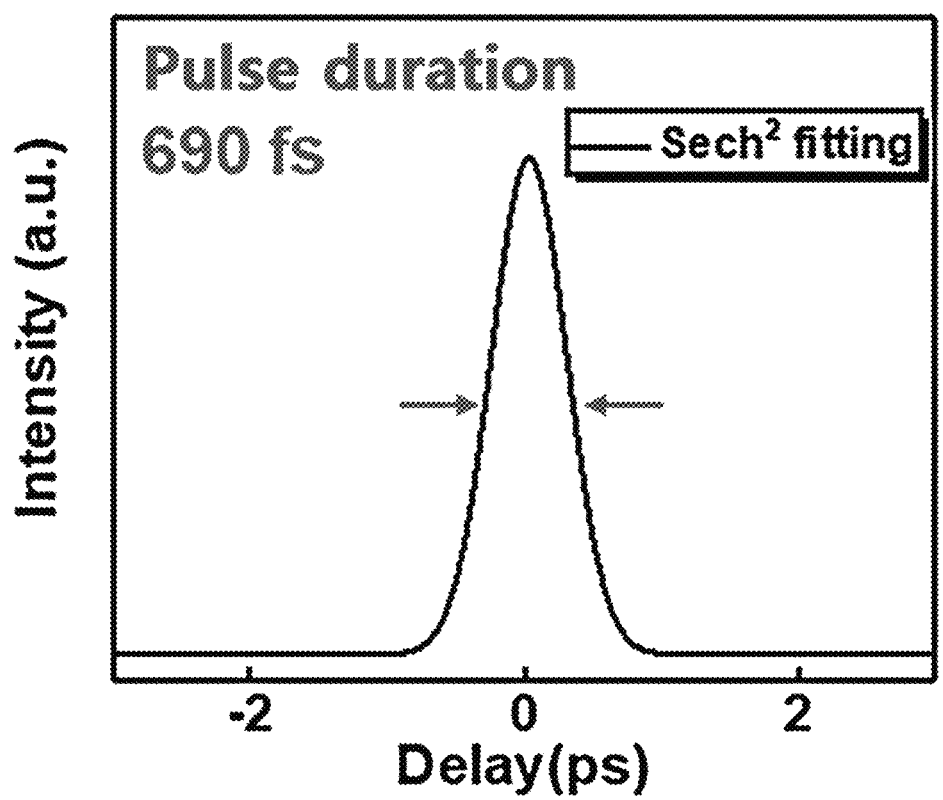

FIGS. 15A to 15C are diagram showing the characteristics of a pulsed signal generated by the passively mode-locked laser by interaction according to the experimental example of the present disclosure.

In this experimental example, the passively mode-locked laser system 1000 shown in FIG. 10 is used. The polymer waveguide 10 of FIG. 14 is used as an optical device. An EDFA having 500 mA of pump current level is used as a gain medium. To control the total chromatic dispersion, a 40 m long SMF surplus is added.

A pulse laser may be obtained from a continuous wave laser by the polymer waveguide 10. Here, the pulse laser may be obtained with the spectrum characteristics of the center wavelength of 1561.81 nm and FWHM of 9.47 nm as shown in FIG. 15A, and the repetition rate of 2.35 MHz and the pulse duration of 690 fs as shown in FIGS. 15B and 15C. That is, a mode-locked pulse laser with a duration on the femtosecond scale may be obtained through the polymer waveguide 10 of FIG. 2.

While the present disclosure has been hereinabove described with reference to the embodiments shown in the drawings, this is provided for illustration purposes only and it will be appreciated by those skilled in the art that various modifications and variations may be made thereto. However, it should be noted that such modifications fall within the technical protection scope of the present disclosure. Therefore, the true technical protection scope of the present disclosure should be defined by the technical spirit of the appended claims.

What is claimed is:

1. A method for manufacturing a polymer waveguide accommodating dispersed graphene, the method comprising:
forming a cladding layer made of a first polymer on a substrate;
removing part of the cladding layer to form a groove for the waveguide; and
forming a core accommodating dispersed graphene therein on the groove.

2. The method for manufacturing a polymer waveguide accommodating dispersed graphene according to claim 1, wherein forming the core comprises:
coating a graphene dispersed solution on the groove; and
curing the graphene dispersed solution to form the core, and
wherein the graphene dispersed solution is a mixed solution in which a suspension containing graphene dissolved in an organic solvent that dissolves a polar molecule is mixed with a second monomer solution that will be polymerized into a polymer.

3. The method for manufacturing a polymer waveguide accommodating dispersed graphene according to claim 2, wherein the mixed solution has a graphene concentration lower than a threshold concentration at which the graphene is kept in a dispersed state.

4. The method for manufacturing a polymer waveguide accommodating dispersed graphene according to claim 3, wherein the core accommodating the dispersed graphene is configured to have a higher effective refractive index than the cladding layer.

5. The method for manufacturing a polymer waveguide accommodating dispersed graphene according to claim 4, wherein the threshold concentration is $0.95 \times 10^{-3}$ wt % to $1.05 \times 10^{-3}$ wt %.

6. The method for manufacturing a polymer waveguide accommodating dispersed graphene according to claim 5, wherein a concentration of the graphene dissolved in the suspension is $7 \times 10^{-4}$ wt % or above and $9 \times 10^{-4}$ wt % or less.

7. The method for manufacturing a polymer waveguide accommodating dispersed graphene according to claim 1, wherein the graphene dispersed in the core is in the form of flakes.

8. The method for manufacturing a polymer waveguide accommodating dispersed graphene according to claim 1, wherein the core and the cladding layer are cured at a temperature of 100 to 200° C. to prevent crystals of the graphene from being damaged.

9. The method for manufacturing a polymer waveguide accommodating dispersed graphene according to claim 1, wherein the graphene is at least one material selected from the group consisting of pure graphene, graphene oxide by oxidation of the pure graphene, reduced graphene oxide by reduction of the graphene oxide and a combination thereof.

10. The method for manufacturing a polymer waveguide accommodating dispersed graphene according to claim 2, wherein curing the graphene dispersed solution comprises:
when reduced graphene oxide (rGO) is dissolved in the mixed solution,
polymerizing the second monomer of the mixed solution into a second polymer and photopolymerizing the mixed solution to restore disrupted $sp^2$ bonds in the dissolved rGO.

11. A polymer waveguide which is an optical waveguide, comprising:
a substrate;
a cladding layer made of a first polymer, formed on the substrate, wherein a first monomer is polymerized into the first polymer, and the cladding layer has a groove for the waveguide by removing part of the cladding layer; and
a core accommodating graphene therein, formed on the groove.

12. A passively mode-locked laser comprising the polymer waveguide of claim 11, a laser cavity to generate a continuous wave laser and an optical fiber,
wherein the passively mode-locked laser further comprises at least one of a wavelength division multiplexer to be connected to an amplifier that provide a gain into the laser cavity, an isolator, a polarization controller (PC), and a coupler, and
the polymer waveguide is configured to generate a pulsed laser by interaction of graphene with a propagating laser.

* * * * *